(12) United States Patent
Carr et al.

(10) Patent No.: US 8,731,876 B2
(45) Date of Patent: May 20, 2014

(54) CREATING EDITABLE FEATURE CURVES FOR A MULTI-DIMENSIONAL MODEL

(75) Inventors: Nathan A. Carr, San Jose, CA (US); Pushkar P. Joshi, Fremont, CA (US); James L. Andrews, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 307 days.

(21) Appl. No.: 12/853,968

(22) Filed: Aug. 10, 2010

(65) Prior Publication Data

US 2013/0124149 A1    May 16, 2013

Related U.S. Application Data

(60) Provisional application No. 61/235,960, filed on Aug. 21, 2009.

(51) Int. Cl.
*G06F 7/60* (2006.01)

(52) U.S. Cl.
USPC ............ 703/2; 703/1; 703/3; 703/4; 345/419; 345/423; 345/420; 345/582; 345/428

(58) Field of Classification Search
USPC ........................ 345/419, 420, 418; 703/2, 6, 9
See application file for complete search history.

(56) References Cited

U.S. PATENT DOCUMENTS

| | | | | |
|---|---|---|---|---|
| 5,929,860 A | * | 7/1999 | Hoppe | 345/419 |
| 6,046,744 A | * | 4/2000 | Hoppe | 345/419 |
| 2005/0168460 A1 | * | 8/2005 | Razdan et al. | 345/419 |

OTHER PUBLICATIONS

Nealen et al. A Sketch-Based Interface for Detail-Preserving Mesh Editing ACM 0730-0301/05/0700-1142, 2005.*
Alliez, P., Cohen-Steiner, D., Devillers, O., L'Evy, B., and Desbrun, M. 2003. Anisotropic polygonal remeshing. In SIGGRAPH '03: ACM SIGGRAPH 2003 Papers.
Botsch, M., and Kobbelt, L. 2004. An intuitive framework for real-time freeform modeling. ACM Trans. Graph. 23, 3,630-634.
Cohen-Steiner, D., Alliez, P., and Desbrun, M. 2004. Variational shape approximation. In SIGGRAPH '04: ACM SIGGRAPH 2004 Papers, ACM, New York, NY, USA, 905-914.
Eck, M., and Hoppe, H. 1996. Automatic reconstruction of bspline surfaces of arbitrary topological type. In SIGGRAPH '96: Proceedings of the 23rd annual conference on Computer graphics and interactive techniques, ACM, New York, NY, USA, 325-334.
Gal, R., Sorkine, O., Mitra, N. J., and Cohen-Or, D. 2009. iwires: an analyze-and-edit approach to shape manipulation. ACM Trans. Graph. 28, 3, 1-10.

(Continued)

*Primary Examiner* — Omar Fernandez Rivas
*Assistant Examiner* — Cuong Luu
(74) *Attorney, Agent, or Firm* — Wolfe-SBMC

(57) ABSTRACT

Various embodiments of a method and apparatus for creating editable feature curves for a multi-dimensional model represented by a tessellated mesh are described. A mesh representation of a multi-dimensional model may not support intuitive modification of the model. The mesh representing the multi-dimensional model may be analyzed to extract feature curves that define the characteristics of the multi-dimensional model. Such feature curves may provide an intuitive mechanism for modifying the multi-dimensional model. The model may be modified by changing the constraints of the feature curves defining the model's characteristics. For example, a constraint may be modified to change the angle of the surface on either side of a location on a feature curve. A compressed representation of a multi-dimensional model may include the feature curves that define the shape of multi-dimensional model and a set of boundary curves that represent disjoint regions of the multi-dimensional model.

20 Claims, 16 Drawing Sheets

(56) References Cited

OTHER PUBLICATIONS

Garland, M., and Heckbert, P. S. 1997. Surface simplification using quadric error metrics. In SIGGRAPH '97: Proceedings of the 24th annual conference on Computer graphics and interactive techniques, ACM Press/Addison-Wesley Publishing Co., New York, NY, USA, 209-216.

Hildebrandt, K., Polthier, K., and Wardetzky, M. 2005. Smooth feature lines on surface meshes. In SGP '05: Proceedings of the third Eurographics symposium on Geometry processing, Eurographics Association, Aire-la-Ville, Switzerland, Switzerland, 85.

Hoppe, H., Derose, T., Duchamp, T., Halstead, M., Jin, H., McDonald, J., Schweitzer, J., and Stuetzle, W. 1994. Piecewise smooth surface reconstruction. In SIGGRAPH '94: Proceedings of the 21st annual conference on Computer graphics and interactive techniques, ACM, New York, NY, USA, 295-302.

Igarashi, T., Matsuoka, S., and Tanaka, H. 1999. Teddy: A sketching interface for 3d freeform design. In SIGGRAPH, 409-416.

Kara, L., and Shimada, K. 2008. Supporting early styling design of automobiles using sketch-based 3d shape construction. In Proceedings of Computer-Aided Design and Applications, CAD Solutions LLC., 867-876.

Karpenko, O. A., and Hughes, J. F. 2006. Smoothsketch: 3d free-form shapes from complex sketches. ACM Transactions on Graphics 25/3, 589-598.

Lee, A., Moreton, H., and Hoppe, H. 2000. Displaced subdivision surfaces. In SIGGRAPH '00: Proceedings of the 27th annual conference on Computer graphics and interactive techniques, ACM Press/Addison-Wesley Publishing Co., New York, NY, USA, 85-94.

Li, W.-C., Ray, N., and L'Evy, B. 2006. Automatic and interactive mesh to t-spline conversion. In SGP '06: Proceedings of the fourth Eurographics symposium on Geometry processing, Eurographics Association, Aire-la-Ville, Switzerland, Switzerland, 191-200.

Nealen, A., Igarashi, T., Sorkine, O., and Alexa, M. 2007. Fibermesh: designing freeform surfaces with 3d curves. ACM Trans. Graph. 26, 3, 41.

Ohtake, Y., Belyaev, A., and Seidel, H.-P. 2004. Ridge-valley lines on meshes via implicit surface fitting. ACM Trans. Graph. 23, 3, 609-612.

Pinkall, U., and Polthier, K. 1993. Computing discrete minimal surfaces and their conjugates. Experimental Mathematics 2, 1, 15-36.

Rusinkiewicz, Szymon. 2004. Estimating curvatures and their derivatives on triangle meshes. In Symposium on 3D Data Processing, Visualization, and Transmission.

Sorkine, O., and Cohen-Or, D. 2004. Least-squares meshes. Shape Modeling and Applications, International Conference on 0, 191-199.

Thirion, J.-P. 1996. The extremal mesh and the understanding of 3d surfaces. Int. J. Comput. Vision 19, 2, 115-128.

Weinkauf, T., and Gnther, D. 2009. Separatrix persistence: Extraction of salient edges on surfaces using topological methods. Computer Graphics Forum (Proc. SGP '09) 28, 5 (July).

\* cited by examiner

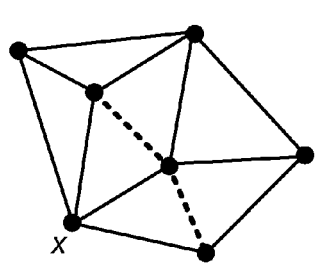 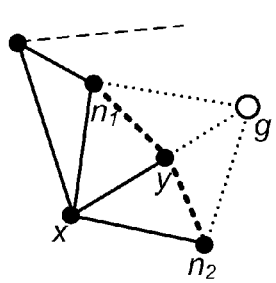 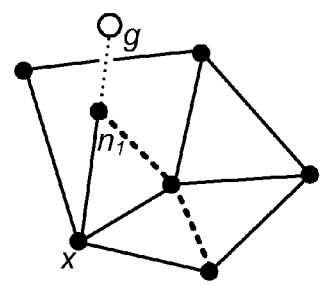
FIG. 10A  FIG. 10B  FIG. 10C
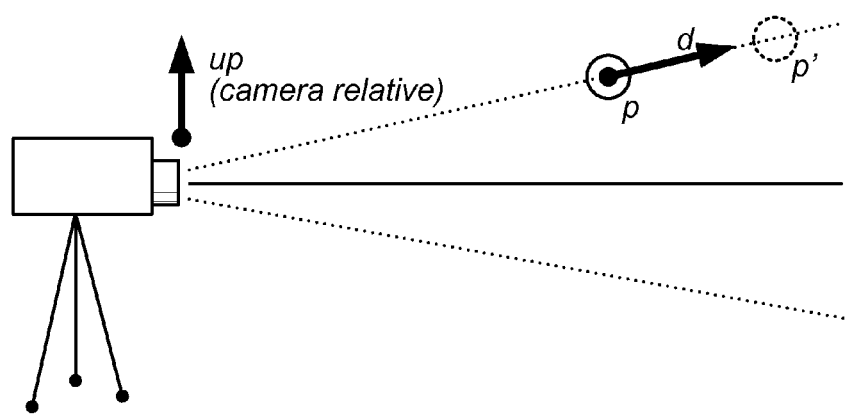
FIG. 11

CREATING EDITABLE FEATURE CURVES FOR A MULTI-DIMENSIONAL MODEL

PRIORITY INFORMATION

This application claims benefit of priority of U.S. Provisional Application Ser. No. 61/235,960 entitled "Method and Apparatus for Representing a 3D Shape using Editable Feature Curves" filed Aug. 21, 2009, the content of which is incorporated by reference herein in its entirety.

FIELD OF THE INVENTION

The present invention is directed to computer systems. More particularly, the invention is directed to three-dimensional modeling of physical objects within a computing environment.

BACKGROUND

Description of the Related Art

Three-dimensional (3D) modeling of physical objects has many applications in the area of computer graphics. For example, computer-based 3D models of objects may be employed to generate animation, to insert digital images into film or photographic images, to design objects, and for many other purposes. As computing power has increased and 3D modeling algorithms have become more sophisticated, it has become possible to model objects of increasing complexity. For example, an object model may include data representative of hundreds or thousands of individual surfaces, or more.

While a complex 3D model having many surfaces may express more realistic detail than a less complex 3D model, maintaining a large number of model surfaces may present usability challenges. For example, as the number of surfaces of a 3D model increases, it may become more difficult to display the model to a user in a way that allows the user to easily interact with the model. A user seeking to edit or manipulate a particular surface of a complex model may be frustrated by a cluttered model display, and may be more likely to inadvertently modify a surface other than the one intended.

A 3D model may typically be represented and stored, under conventional methods, using a low-level, hierarchically flat format. This low-level format may include vertex positions of a polygon mesh (e.g. a tessellated mesh) that represents the 3D model. The low-level format may exclude the high-level generation information that may have been used to generate the 3D model. For example, a complex 3D model may be expressed as a sequence of operations performed on a set of basis shapes or handles. The operations performed on the set of basis shapes or handles are examples of high-level generation information that may be excluded from a 3D model that is stored using a low-level format.

A low level representation of a 3D model, for example a representation including the vertex positions of a polygon mesh that defines the 3D model, may not be suitable for intuitive user editing of the 3D model. For example, a large number of vertex positions may be required to represent a complex 3D model. The large number of vertex positions may present a confusing, cluttered representation of the 3D model to a user. For example, a user may have trouble editing a particular region of the 3D model represented by a dense set of vertices. More specifically, the large number of vertices in the particular region of the 3D model may significantly increase the chances of the user misplacing the new vertices corresponding to the region, or inadvertently selecting a vertex that corresponds to a completely different region of the 3D model. Accordingly, the vertex positions may not be suitable as a basis for editing a 3D model.

SUMMARY

Various embodiments of a method and apparatus for creating editable feature curves for a multi-dimensional geometric model are described. A multi-dimensional model may be represented using a low-level, hierarchically flat format which may include the vertex positions of a connected mesh. The connected mesh may be a tessellated, polygon mesh, such as a triangular mesh. The tessellated mesh which represents the multi-dimensional model may be analyzed and reverse engineered to extract high-level generation information for the multi-dimensional model. For example, feature curves that lie on the surface of the multi-dimensional model may be extracted. The feature curves may define one or more characteristics of the multi-dimensional model and may represent a minimal set of distinguishing characteristics of the multi-dimensional model that are relevant to an artist or designer who may wish to manipulate the characteristics of the multi-dimensional model. Such feature curves may be a set of handles that provide an intuitive mechanism for an artist or designer to modify the characteristics of the multi-dimensional model. More specifically, the characteristics of the multi-dimensional model may be modified by changing the parameters of the feature curves that define the characteristics of the multi-dimensional model.

Feature curves may be generated by analyzing the characteristics of a multi-dimensional model to locate distinguishing features of the multi-dimensional model. For example, both sharp edges and smooth regions of the multi-dimensional model may be used to identify feature curves that represent the shape of the multi-dimensional model. In some embodiments, the feature curves may be defined as surface normal constraints. Other embodiments may define the feature curves as mean curvature constraints or a combination of surface normal constraints and mean curvature constraints.

A user may edit the characteristics of a multi-dimensional model, such as the shape of the surface of the model, by changing the feature curve constraints of the multi-dimensional model. For example, the surface normal constraint defined by a feature curve may be modified to change the angle of the surface on either side of a particular location on the feature curve. Using constraints specified for or stored at feature curve vertices, embodiments are able to control the shape modification efficiently using a single linear system. A user may also modify the characteristics of a multi-dimensional model by adding new feature curves to the shape and changing the constraints of the new feature curves.

In some embodiments, the mesh connectivity information and the feature curves of a multi-dimensional model may provide a complete representation of the model which may be stored in a computer-accessible medium. The multi-dimensional model may be reconstructed, for example, for visual display and modification, from the mesh connectivity information and feature curves. A compressed representation of a multi-dimensional model may include the feature curves that define the shape of a multi-dimensional model and a set of boundary curves that represent disjoint regions of the multi-dimensional model. The set of boundary curves defined for the multi-dimensional model may enable a compressed representation of the multi-dimensional model by replacing the mesh connectivity information in the representation of the multi-dimensional model. In some embodiments, the multi-dimensional model may be fully represented by (and reconstructed from) the feature and boundary curves, without the need for any mesh connectivity information.

BRIEF DESCRIPTION OF THE DRAWINGS

FIGS. 10a through 10c illustrate oriented position constraints according to some embodiments.

FIG. 11 illustrates pixel-position constraints according to some embodiments.

Figure 1:
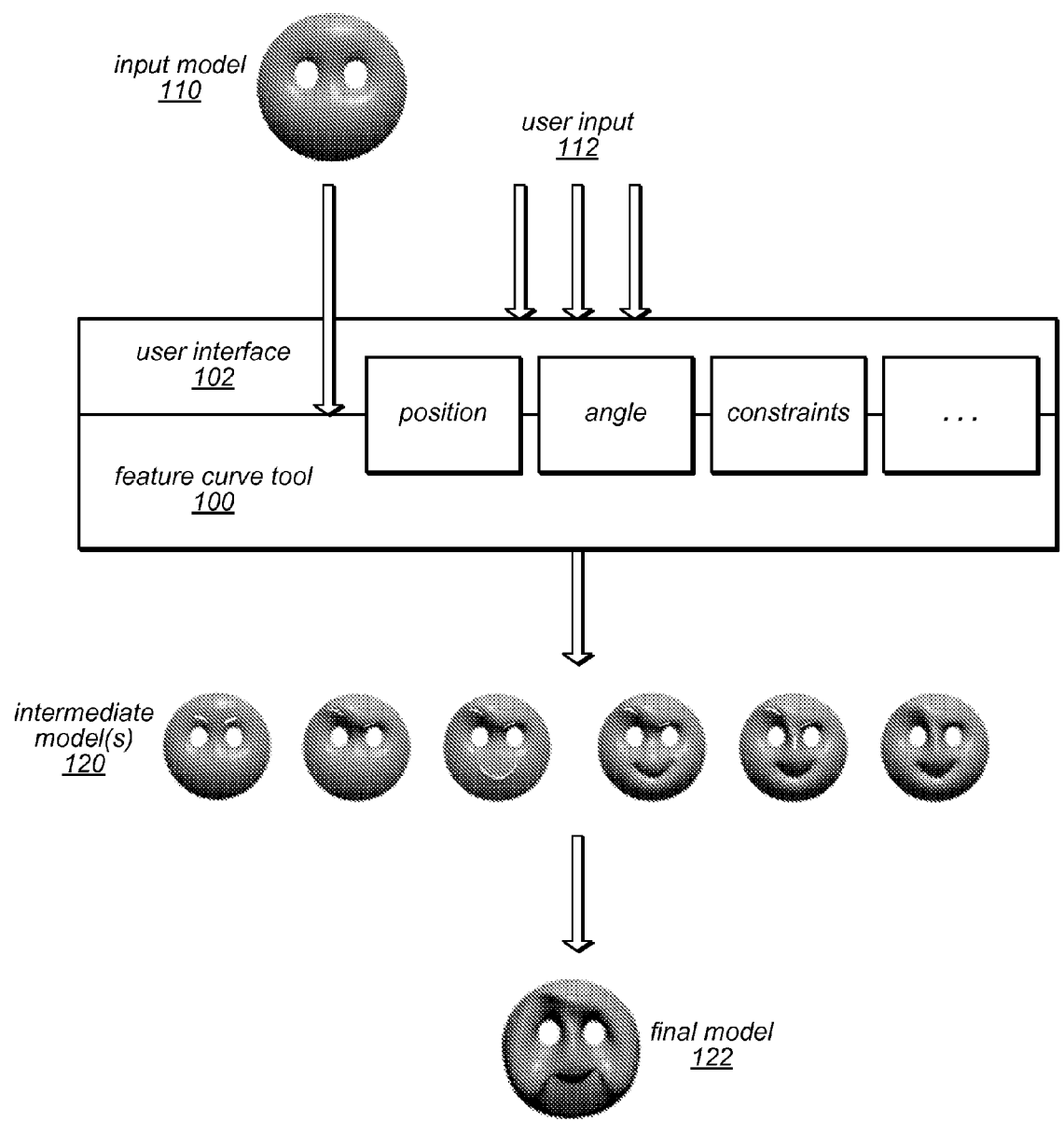
FIG. 1 illustrates an example embodiment of a feature curve tool.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm as described herein, is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for creating editable feature curves for a three-dimensional (3D) geometric model are described. Embodiments of an editable feature curve generation method, which may be implemented as or in a tool, module, plug-in, stand-alone application, etc. may be used to generate feature curves that represent the distinguishing features of the shape of a 3D model. Such feature curves may provide an intuitive mechanism for modifying the shape of the 3D model. For simplicity, implementations of embodiments of the editable feature curve generation method described herein will be referred to collectively as a feature curve tool.

FIG. 1 illustrates an example embodiment of a feature curve tool that may implement an editable feature curve generation method, as described herein. As illustrated in FIG. 1, feature curve tool 100 may implement a user interface 102 that provides one or more textual and/or graphical user interface elements, modes or techniques via which a user may enter, modify, indicate or select 3D models, to be modified (represented by input model 110). User interface 102 may provide one or more interface elements via which a user may enter, modify, or select feature curves, specify or modify smooth or sharp position and boundary constraints including mean curvature constraints and surface normal constraints, specify pixel-position constraints, and in general provide input to and/or control various aspects of 3D shape modification using embodiments of a feature curve tool 100 as described herein. In some embodiments, feature curve tool 100 may provide real-time or near-real-time feedback to the user via dynamic display on a display device(s) of modifications to the target model 110 made according to the user input via user interface 102. Thus, the user may make additional input or manipulation of the 3D shape using the feature curve tool 100, as illustrated by intermediate image(s) 120. Results are output as the final model 122. Final model 122 (as well as intermediate models(s) 120) may be displayed on a display device, printed, and/or written to or stored on any of various types of memory media, such as storage media or storage devices.

As described herein, a 3D model, represented in a low-level, hierarchically flat format under conventional methods, may be reverse-engineered to extract the high-level generation information of the 3D model. More specifically, the shape of the 3D model which is defined by the low-level representation may be analyzed to extract high-level generation information for the model. Examples of such high-level generation information may include, but are not limited to, feature curves, extrusion paths, sweep radii, CSG primitives and corresponding CSG transformations. The high-level generation information may be used by the feature curve tool to provide an intuitive visual representation of a 3D model which includes feature curves that are suitable for user editing. For example, the 3D model may be modified by altering the high-level parameters (e.g. feature curves) that may be displayed on the visual representation of the model.

The low-level, hierarchically flat format which may represent a 3D model under conventional methods may be a tessellated mesh. In some embodiments, the tessellated mesh representing the 3D model may be analyzed by a feature curve tool to extract high-level generation information from the 3D model, such as feature curves that lie on the surface of the 3D model. Such curves, referred to herein as "feature curves" may fully define the 3D shape by representing distinguishing features of the 3D shape, in some embodiments. For example, the feature curves may represent the minimal set of distinguishing lines of a 3D shape that are relevant to an artist or designer who may edit the 3D shape. The feature curves may also provide an intuitive mechanism for editing the representation of the 3D shape, as described in more detail below.

The tessellated mesh (e.g. a triangular mesh) that may be provided to the feature curve tool may be a mesh that is "clean". While embodiments are generally described herein as using a triangular mesh, other polygon meshes may be used. A "clean" triangular mesh, may adhere to the following characteristics (other characteristics are possible in other embodiments): the triangular mesh is 2-manifold everywhere, the triangular mesh is reasonably sampled, and the triangular mesh is "regular" at most surface points. A reasonably sampled triangular mesh may use dense groups of triangular samples to represent regions of the 3D shape that include high curvature. In some embodiments, a "regular" triangular mesh has a well-defined tangent plane at most surface points.

The feature curve tool may be configured to define representative feature curves by analyzing the "clean" triangular mesh which represents a 3D shape. The representative feature curves, in some embodiments, may be a minimal set of curves needed to describe the distinguishing features of the 3D shape. In some embodiments, the output of the feature generation tool may be feature curves implemented as polylines that lie on the triangular mesh (e.g. on the surface of the 3D shape) and may provide an intuitive set of handles for manipulating the surface of the 3D shape.

The feature curve tool may be configured to determine feature curves that represent the 3D shape by analyzing the triangular mesh to locate distinguishing features of the 3D shape. For example, the feature curve tool may identify both sharp and smooth regions of the 3D shape and may define feature curves representing distinguishing features of each region. In some embodiments, the feature curve tool may be configured to use different feature curve generation techniques, as described below, to determine the appropriate placement of feature curves on the 3D shape. For example, the feature curve tool may be configured to use different techniques to locate regions of the 3D shape having large dihedral angles (e.g., sharp edges) and regions of the 3D shape that are ridges and valleys (e.g., smooth areas of curvature). In other embodiments, a user may be allowed to specify feature curves via a curve drawing interface.

Each point on a feature curve may represent a user editable 3D position that may be interpolated to determine the characteristics of the surface of the 3D model at that position. For example, a user may edit a surface of a 3D shape at a particular point on a feature curve by changing the angle of the surface on either side of the point. The weight of the angle of the surface on either side of the feature curve point may also be a user-controllable parameter. In some embodiments, the feature curves may be defined as surface normal constraints. Other embodiments may define the feature curves as mean curvature constraints or a combination of surface normal constraints and mean curvature constraints.

As previously mentioned, a user may edit the surface of a 3D model by changing the constraints of a feature curve of the 3D model. For example the surface normal constraint defined by a feature curve may be modified to change the angle of the surface on either side of a particular location on the feature curve. Using constraints specified for or stored at feature curve vertices, embodiments are able to control the 3D surface modification efficiently using a single linear system. In some embodiments, a user may modify a 3D shape by adding new feature curves to the shape and changing the constraints of the new feature curves.

Figure 2:
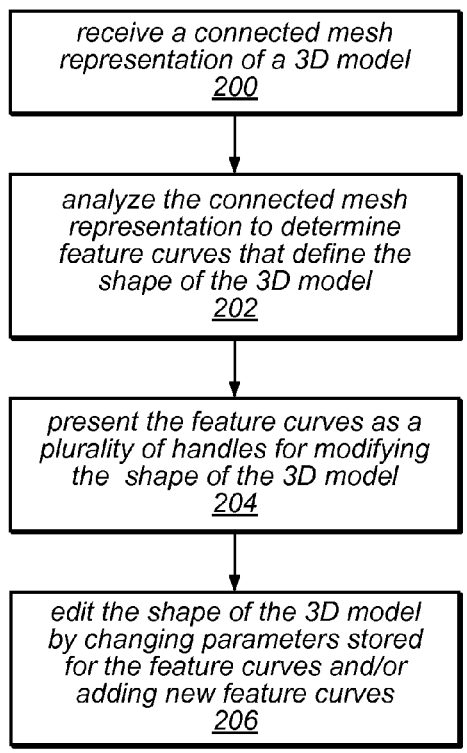
FIG. 2 is a flowchart of an editable feature curve generation method according to various embodiments.

Editable feature curves representing a 3D shape may be generated by the feature curve tool, which may be configured to analyze a triangulated mesh representation of a 3D model. FIG. 2 is a flowchart of an editable feature curve generation method according to various embodiments. As shown in 200 of FIG. 2, the method may include receiving a connected mesh representation of a 3D model. For example, as described above, the connected mesh may be a polygon mesh (e.g. a tessellated mesh) that represents the shape of 3D model. The polygon mesh, in some embodiments, may be a triangular mesh, although in other embodiments other types of polygons may be used for the mesh. In some embodiments, the triangular mesh may be represented and stored in a low-level format, such as a set of vertex positions of the triangular mesh.

As illustrated in 202 of FIG. 2, the method may include analyzing the connected mesh representation to determine feature curves that define the shape of the 3D model. In some embodiments, analysis of the connected mesh representation of a 3D model may produce a view-independent, salient set of feature curves that fully characterize the shape of the 3D model. In some embodiments, the set of feature curves may be polylines that lie on the surface of the 3D shape and may be the minimal set of feature curves needed to fully describe and control (e.g., modify) a representation of the 3D shape. The feature curves may represent the minimal set of distinguishing lines of a 3D shape that are relevant to an artist or designer who may modify a representation of the 3D shape. For example, regions that are distinguishing features of the 3D shape, such as sharp edges and ridges and valleys may be selected as feature curves. Various techniques may be employed for selecting representative feature curves for a 3D shape, as described in further detail below.

As illustrated in 204 of FIG. 2, the method may include presenting the feature curves as a plurality of handles for modifying the shape of the 3D model. For example, as described above, each point of a feature curve may represent a user editable 3D position that may be interpolated to determine the characteristics of the 3D surface at that position. The feature curves may be displayed by superimposing the feature curves on a visual display of the 3D model. For example, as illustrated in FIG. 4b, the feature curves may visually outline the distinguishing features of the 3D model. The method illustrated in FIG. 2, as shown in 206, may include editing the shape of the 3D model by changing the parameters stored for the feature curves or adding new feature curves. In some embodiments, examples of the parameters that may be stored for each feature curve include, but are not limited to position, angle, and angle strength. In some embodiments, the feature curves may be defined as editable constraints of the 3D shape. For example, a constraint of a feature curve may be modified to change the angle of the surface of the 3D shape on either side of a point on the feature curve. As another example, new feature curves may be added to a 3D shape by a user and the user may modify the representation of the 3D shape by changing the constraints of the new feature curves. Further details regarding modifying a representation of a 3D shape using feature curves are described below.

Feature Curve Definition

Figure 3:
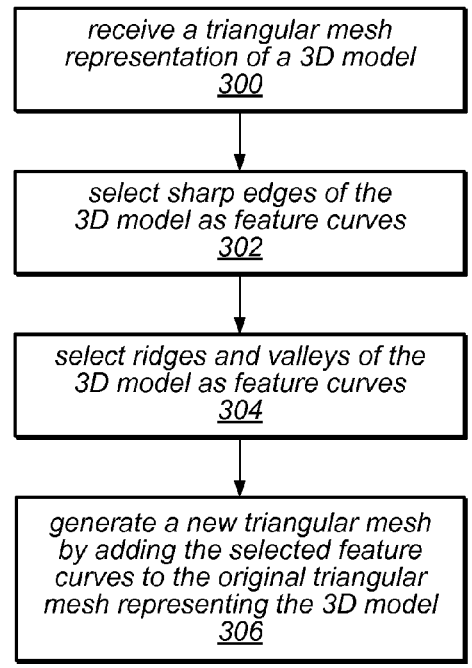
FIG. 3 is a flowchart of a method that may be used to define feature curves for a 3D shape using a triangulated mesh representation of the 3D shape, according to various embodiments

As described above, a set of feature curves defining the shape of a 3D model may be the minimal set of polylines needed to fully describe and modify the 3D shape. A triangulated mesh representing a 3D model may be analyzed using various techniques to define feature curves that accurately represent the shape of the 3D model. FIG. 3 is a flowchart of a method that may be used to create feature curves defining the shape of a 3D model using a triangulated mesh representation of the 3D model, according to various embodiments. As shown in 300 of FIG. 3, the method may include receiving a triangular mesh representation of a 3D model. While embodiments are generally described as using a triangle mesh representation of a 3D model, other polygon meshes may be used.

As shown in 302, various embodiments of the method for creating feature curves that define the shape of a 3D model using a triangulated mesh representation of the 3D model may include selecting sharp edges of the 3D model as feature curves. In some embodiments, a sharp edge on a 3D model may be an edge which has a large dihedral angle. More specifically, a location on a 3D model at which two planes along the surface of the 3D model intersect may be considered an edge. The angle between the planes may be considered, in some embodiments, a dihedral angle. In some embodiments, such locations of plane intersection with dihedral angles above a specified threshold may be considered sharp edges of the 3D model. In some embodiments, each sharp edge of a 3D model may be selected as a location for a feature curve. In other embodiments, other methods for identifying sharp edges of a 3D model may be employed.

Smooth regions of the 3D model may also be represented by feature curves in order to obtain a set of feature curves that fully define the shape of the 3D model. In some embodiments, as shown in 304, ridges and valleys of a 3D model may be selected as feature curves representing the smooth regions of the 3D model. Ridges and valleys of a 3D model may be identified by estimating curvature derivatives on the 3D model. For example, curvatures of a triangular mesh which represents the 3D model may be estimated by analyzing the change of vertex normals across each triangle of the triangular mesh. Ridges and valleys of a 3D model may be estimated as extrema of curvature. An extrema of curvature may occur when a curvature derivative crosses through zero. Accordingly, areas with estimated curvature derivatives which cross through zero, and with principle curvatures greater than a certain threshold may be identified as ridge or valley locations to be represented by feature curves. In some embodiments, feature curves may be placed along ridges and valleys of the 3D model such that the feature curves do not intersect any sharp edges. This limitation may be applied to feature curve selection along areas of ridges and valleys of a 3D model in some embodiments due to the difficulty in estimating curvature derivatives near sharp edges. In other embodiments, other methods for identifying sharp edges of a 3D model may be employed.

Feature curves representing edges, ridges and valleys may provide sufficient topological information to fully represent the shape of a 3D model. Techniques other than those described above may be used for identifying feature curves that represent sharp edges and/or smooth regions of a 3D model. For example, in some embodiments, feature curves representing smooth regions of a 3D model may be the best set of curves that define the smooth shape, rather than curves determined by the ridges and valleys of the 3D model, as described above. In yet other embodiments, feature curves may be defined for regions other than sharp edges and/or smooth regions. In yet other embodiments, feature curves may be specified by a user via a curve drawing user interface.

Figure 4A:
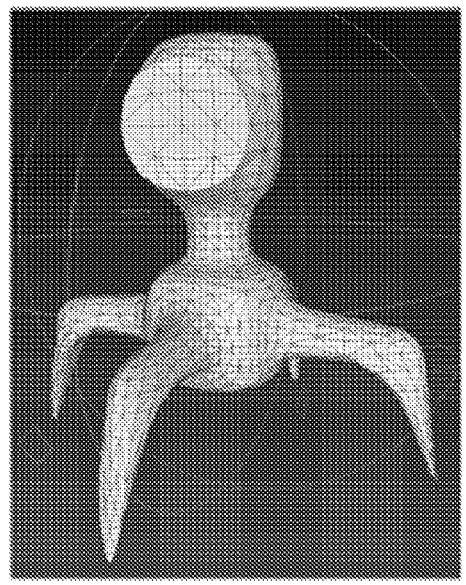
FIGS. 4a through 4c illustrate using areas of ridges and valleys on a 3D shape to select feature curves that may define the regions of the 3D shape which have smooth geometry edges.
Figure 4B:
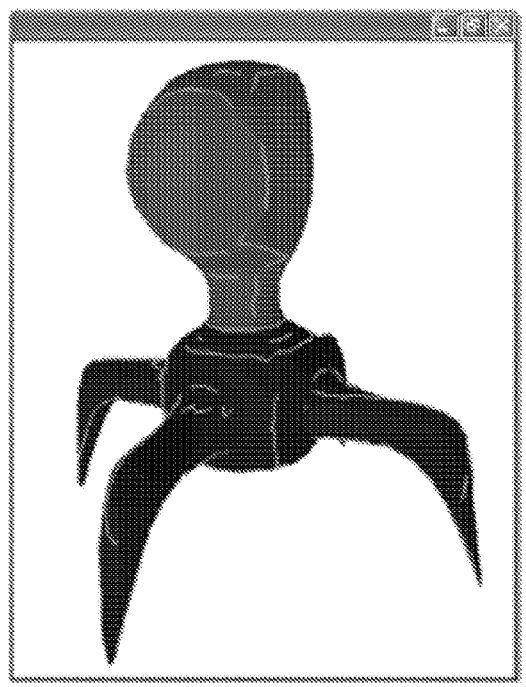
Figure 4C:
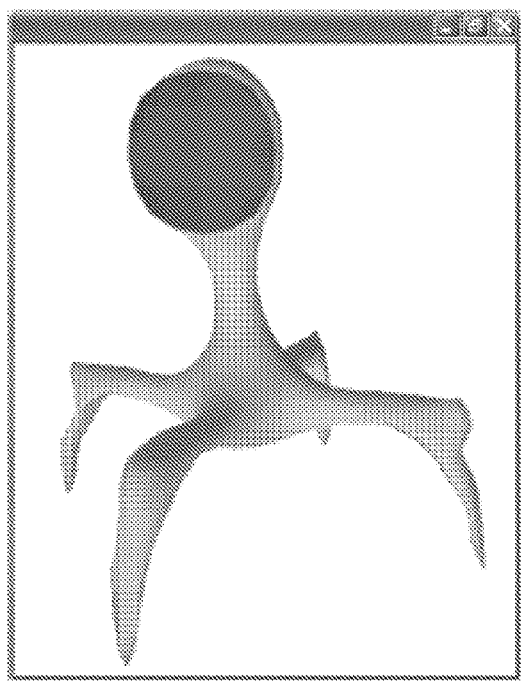

FIGS. 4a through 4c illustrate using areas of ridges and valleys on a 3D model to select feature curves that may define the regions of the 3D model which have smooth geometry edges. FIG. 4a illustrates a densely triangulated 3D model with smooth geometry edges. Using methods similar to those described above, some embodiments may identify the ridges and valleys of the 3D model illustrated in FIG. 4a as feature curves. Examples of such feature curves that may be defined for the ridges and valleys of the 3D model of FIG. 4a are illustrated in FIG. 4b. FIG. 4b also illustrates the 3D model that may be reconstructed using the identified feature curves and remaining free vertex positions (e.g., vertex positions not included in any feature curves).

For example, the positions and normals of vertices along feature curves may provide sufficient information to accurately reconstruct the Max-Planck bust model via implicit surface fitting. As described in further detail below, the free vertex positions of a 3D model may be determined by solving a linear system with respect to the feature curves. One embodiment of a method for reconstructing a 3D model, as illustrated by example in FIG. 4b, will be described in further detail below.

FIG. 4c illustrates, according to some embodiments, a 3D model that may be reconstructed using only sharp edges (e.g., edges with large dihedral angles) of the 3D model illustrated in FIG. 4a as feature curves. As shown in FIG. 4c, a much different (and likely, less accurate) 3D model may be reconstructed if only the sharp edges of a 3D model are used to select feature curves that define the shape of the 3D model. In some embodiments, selecting feature curves to represent areas of ridges and valleys (as opposed to sharp edges) of a 3D model having smooth geometry edges may result in a more accurate representation of the 3D model.

Returning to FIG. 3, the method may include, as shown in 306, generating a new triangular mesh of the 3D model by adding the selected feature curves to the original triangular mesh representing the 3D model. The triangular mesh representing the 3D model may be modified such that an actual mesh edge of the triangular mesh lies on each defined feature curve. For example, the mesh edge(s) closest to a defined feature curve may be adjusted such that the mesh edge(s) lie on the feature curve. The mesh edges that are modified to lie along feature curves may be tagged as feature curve edges. A triangular mesh modified to include feature curve edges may be referred to herein as a "live mesh" since the mesh now includes mesh edges (e.g., feature curves) that can be edited by a user. Creating a "live mesh" representation of a 3D model is described in further detail below.

Using Feature Curves to Modify a 3D Model

As described above, the feature curves defined for a 3D shape may be used to modify the 3D shape. Such feature curves, in some embodiments, may be defined as surface normal constraints and may be used as described below, and as described in U.S. application Ser. No. 12/276,106 entitled "Method and Apparatus for Surface Inflation Using Surface Normal Constraints" filed Nov. 21, 2008, the content of which is incorporated by reference herein in its entirety.

Various embodiments may define the feature curves representing a 3D shape as surface normal constraints used to control modification of the 3D shape. A surface normal, or simply normal, to a flat surface is a vector perpendicular to that surface. Similarly, a surface normal to a non-flat surface is a vector perpendicular to the tangent plane at a point on the surface. Thus, a surface normal constraint specifies that, at a particular point on the surface (e.g., at a point on a feature curve of the surface), the surface normal is to point in a specified direction. As an example, a user may want the surface normal at a point on a feature curve to be facing 45 degrees out of plane to generate a 45 degree bevel, and thus the user may set the surface normal constraint to 45 degrees at the point. Surface normal constraint values may be specified at various feature curve locations, for example at a point or vertex on a feature curve, or for a segment of a feature curve.

Other embodiments may define the feature curves as mean curvature constraints or a combination of surface normal constraints and mean curvature constraints used to control modification of a 3D shape. The mean curvature of a surface is an extrinsic measure of curvature that locally describes the curvature of the surface. Thus, a mean curvature constraint is a specified value for the mean curvature at a particular feature curve location, e.g. at a particular point or vertex on a feature, or for a particular segment of a feature curve.

One embodiment may define feature curves as mean curvature constraints. One embodiment may define feature curves as surface normal constraints. One embodiment may define feature curves as either mean curvature constraints or surface normal constraints. In one embodiment, feature curves may be defined as both mean curvature constraints and surface normal constraints; for example, mean curvature constraints may be used on one portion of a feature curve, and surface normal constraints may be used on another portion of the same feature curve, or on another feature curve. The surface normal constraints and/or mean curvature constraints may be represented by feature curves that lie on the surface of the 3D shape to be modified. In some embodiments, different values may be specified for the curvature constraints at different locations on a feature curve. Embodiments may provide one or more user interface elements via which a user may specify or modify values for the constraints at locations on feature curves. Embodiments may provide one or more user interface elements via which a user may add, delete, or modify feature curves.

In addition to mean curvature constraints and surface normal constraints, some embodiments may allow feature curves to define other types of constraints. For example, one embodiment may allow pixel-position constraints to be specified at points or regions on a surface; the pixel-position constraints may be used to limit surface modification along a vector. For example, a pixel-position constraint may be used to limit inflation to the z axis, and thus prevent undesirable shifting of the surface along the x and y axes. Some embodiments may also allow arbitrary flow directions to be specified for regions or portions of the surface, or for the entire surface. An example is a gravity option that causes the surface to flow "down".

Figure 5A:
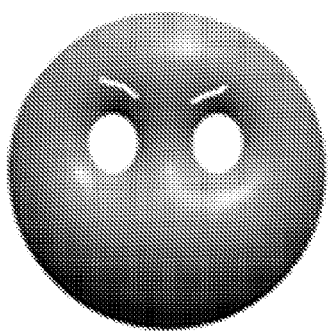
FIGS. 5a through 5f illustrate examples of feature curves that may be used to modify the surface of a 3D shape, according to some embodiments.
Figure 5B:
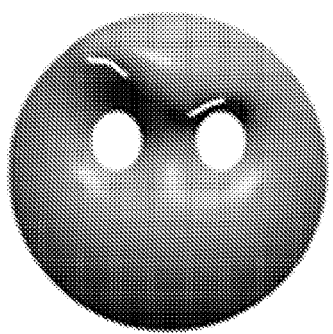
Figure 5C:
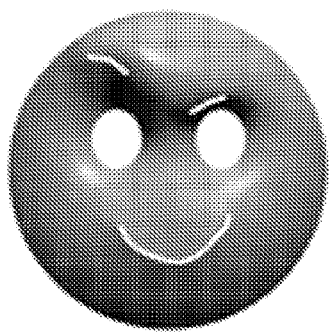
Figure 5D:
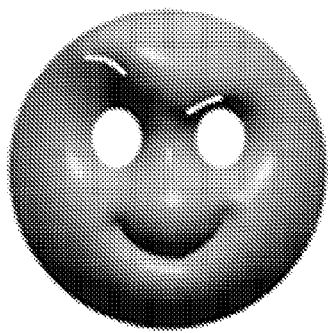
Figure 5E:
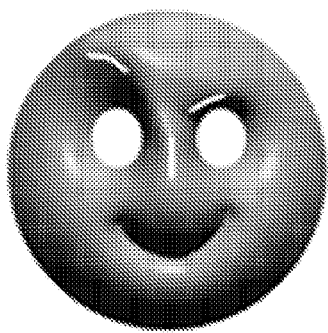
Figure 5F:
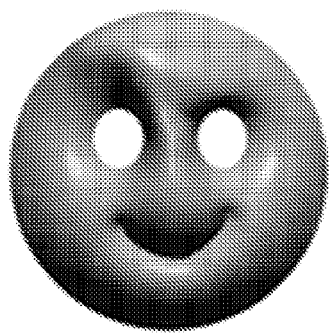

Examples of feature curves that may be used to modify the surface of a 3D shape are illustrated in FIGS. 5a through 5f. The white lines which outline distinguishing features of the shape are examples of feature curves. Note that a feature curve may be a single point, an open line or curve, or a closed boundary. By adding smooth and/or sharp position constraints and boundary constraints, a 3D shape may be modified. Surface normal constraints, mean curvature constraints or both constraints may be used. FIGS. 5a through 5f graphically illustrate freeform 3D shape design using editable feature curves, according to one embodiment. Given the 3D shape of a cartoon face, two smooth position constraints are added near the eyebrows (FIG. 5a). One of the eyebrows is pulled up and the other is pulled down (FIG. 5b). A sharp position constraint is added near the mouth (FIG. 5c) and the nearby surface is inflated by modifying the mean curvature constraints or the surface normal constraints (FIG. 5d). A smooth position constraint is added near the bridge of the nose (FIG. 5e) to get the final surface (FIG. 5f).

Embodiments may leverage characteristics of linear variational surface editing techniques to perform the actual modification of the 3D shape, whether mean curvature constraints, surface normal constraints, or both are used. In contrast to conventional methods that use an implicit surface representation to model surfaces, embodiments may use a polygon (e.g., triangle) mesh to modify the 3D shape. Embodiments may allow both smooth and sharp internal boundaries drawn directly on the 3D surface to modify the surface. In contrast to conventional methods, embodiments implement a linear system and work around the deficiencies of the linear system, instead of using a slower, iterative non-linear solver that is not guaranteed to converge. In addition, embodiments may provide a greater range of modeling operations than conventional methods. While this approach may not allow the solution of the whole mesh as a unified system, embodiments provide an alternative patch-based approach which may be more intuitive to users, as the global solve in conventional methods may result in surface edits tending to have frustrating global effects. While embodiments are generally described as using a triangle mesh, other polygon meshes may be used.

By using the surface normal value or mean curvature value stored at or specified for feature curve vertices as a degree of freedom, embodiments are able to control the modification of the 3D shape efficiently using a single linear system. Embodiments may handle both smooth and sharp feature curves. Feature curve vertices may also have curvature constraints for controlling the modification of the local surface. Embodiments allow designers to modify the 3D surface with 3D shape modeling features such as sharp creases, smooth interpolation curves and local curvature control. Embodiments demonstrate that sophisticated geometric modeling techniques otherwise found in 3D shape modeling tools can effectively be used to design interesting looking images.

Embodiments of the feature curve tool construct the 2-manifold surface that interpolates the feature curves. The surface may be computed as a solution to a variational problem. The method for modifying a 3D shape using feature curves may be formulated to solve for the final surface in a single, sparse linear equation, in one embodiment, without requiring an additional strip of triangles at the feature curve boundary. In embodiments that employ surface normal constraints, additional ghost vertices may be used to control the surface normal internally and at boundaries of the 3D shape; in this embodiment, the 3D shape may be modified by adjusting the surface normal constraints and thus rotating the feature curve's ghost vertices around the feature curve. In embodiments that employ mean curvature constraints, the mean curvature of the vertices on the feature curve is a degree of freedom; the 3D shape may be modified by changing these mean curvature values. Due to the variational setup, the modified 3D surface is smooth except near position constraints. The designer can add, remove, or modify feature curves and constraints at any time of the design phase, and these feature curves and constraints may be smooth or sharp. In one embodiment, feature curves may have a stretching control, allowing the designer to extend the region that conforms to the target curvature constraint or surface normal constraint. In one embodiment, constraints may be specified as pixel-position constraints, meaning that they constrain their vertices to always project to the same pixel from some original camera view.

Figure 6:
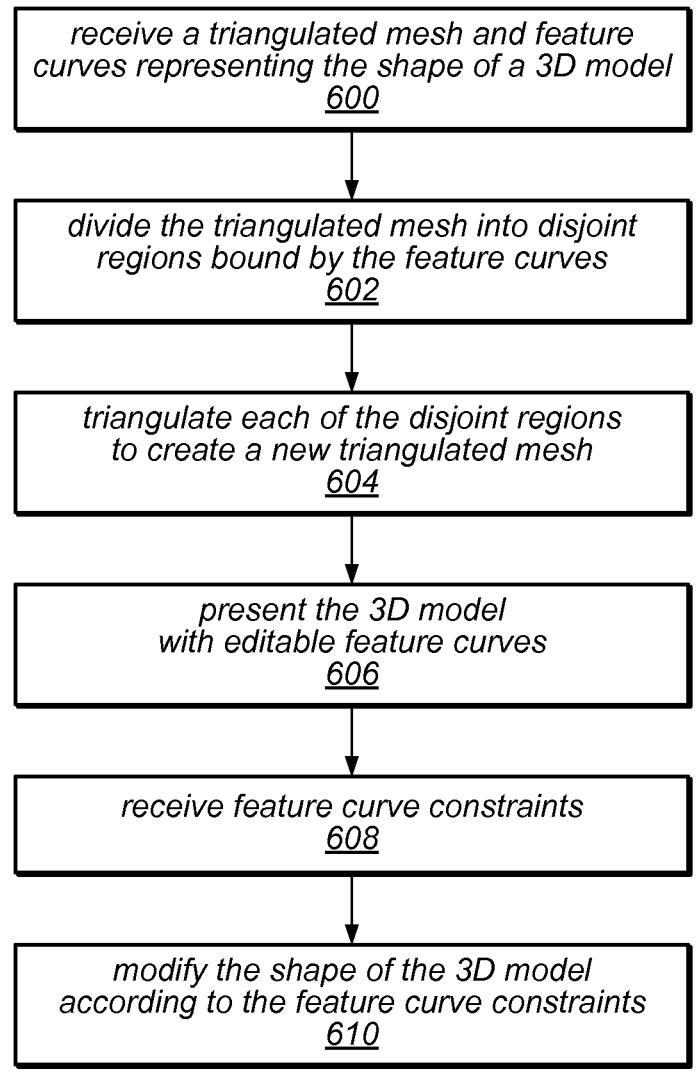
FIG. 6 is a flowchart of a method that may be used to edit a representation of a 3D surface using feature curves, according to some embodiments.

FIG. 6 is a flowchart of a method for modifying the shape of a 3D model using feature curves, according to some embodiments. The feature curve tool may employ this method to modify the shape of a 3D model as directed by user input to the parameters of the feature curves. As indicated at 600, the feature curve tool may receive a triangulated mesh and feature curves representing the shape of a 3D model. In some embodiments, a "live mesh" representation of a 3D model may be generated by creating a new mesh representation that includes the feature curves selected for the 3D model. The "live mesh" representation of the 3D model may be edited by changing the parameters of the feature curves. Elements 602 and 604 of FIG. 6 illustrate a method that may be employed by some embodiments for creating an editable "live mesh" representation of a 3D model. As indicated at 602, the feature curve tool may divide the triangulated mesh into disjoint regions bound by the feature curves. As indicated at 604, the feature curve tool may triangulate each of the disjoint regions to create a new triangulated mesh. The new triangulated mesh representing the 3D model may be a combination of all of the individually triangulated disjoint regions. The new triangulated mesh (e.g., the "live mesh") may be edited based on user input to the parameters of the feature curves included in the "live mesh."

As indicated at 606, the 3D model, including editable feature curves, may be presented to a user for manipulation and/or modification. The method illustrated in FIG. 6 may include, as shown in 608, receiving constraints (e.g., mean curvature constraints and/or surface normal constraints) specified by a user for the feature curves. Other constraints and/or options, such as pixel position constraints, may also be specified for and applied to the feature curves of the 3D to be modified. As indicated at 610, the feature curve tool may then modify the shape of the 3D model according to the specified constraints and options.

Figure 7A:
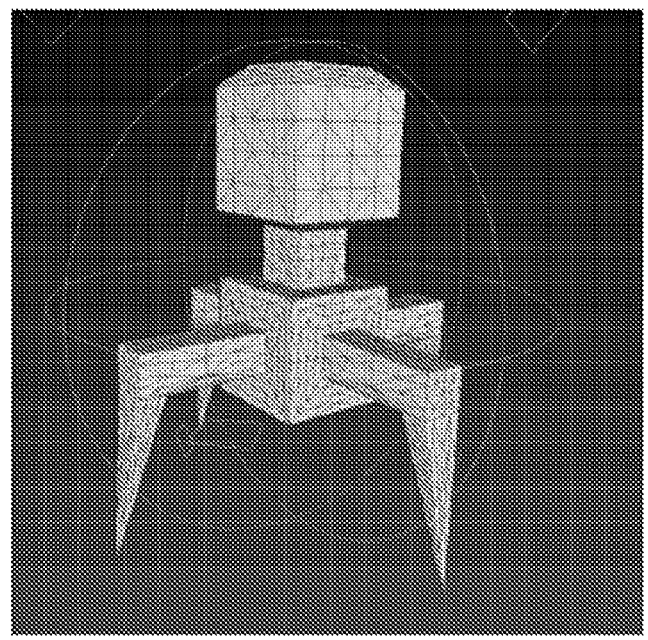
FIGS. 7a through 7f illustrate an example of a method that may be used to modify a representation of a 3D surface using feature curves, according to some embodiments.
Figure 7B:
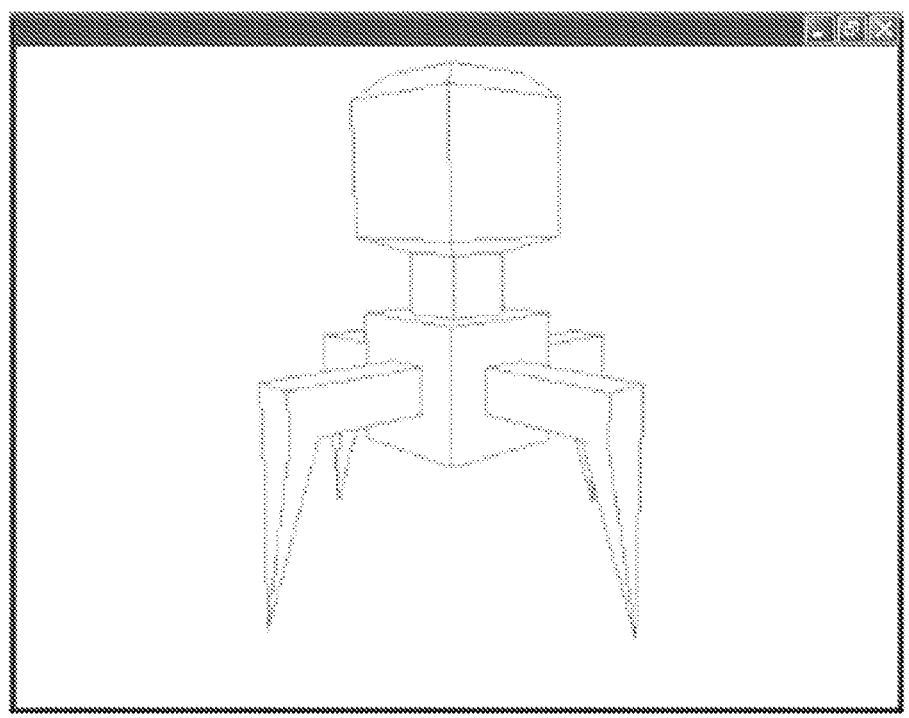
Figure 7C:
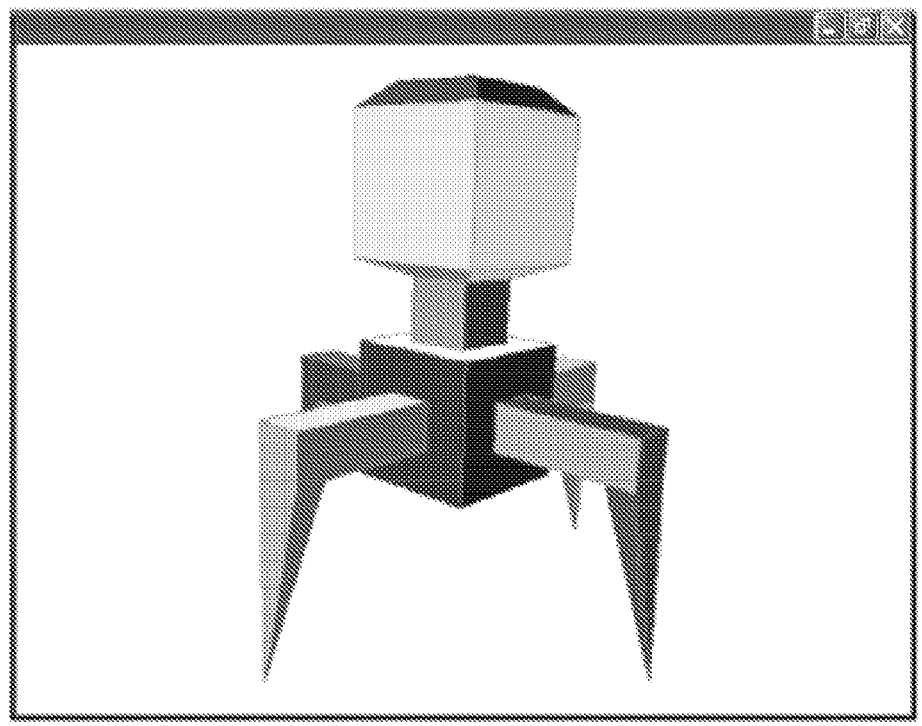
Figure 7D:
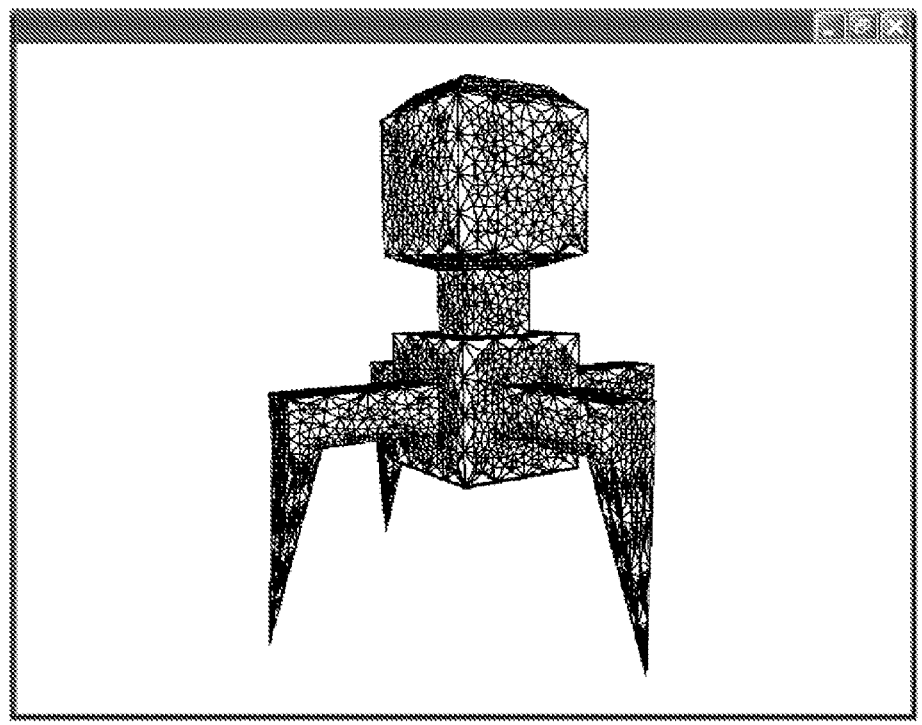
Figure 7E:
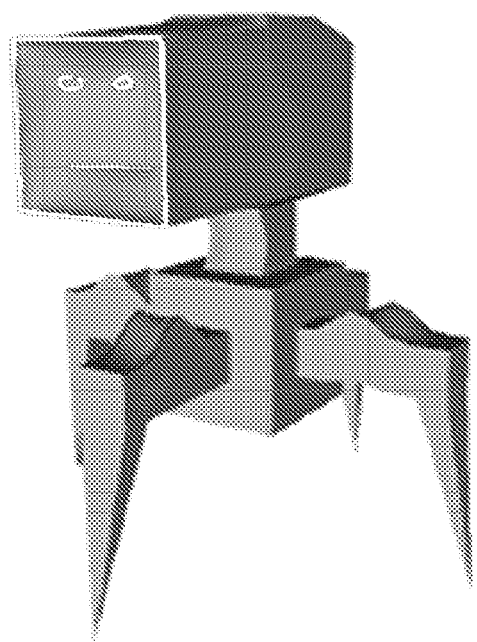
Figure 7F:
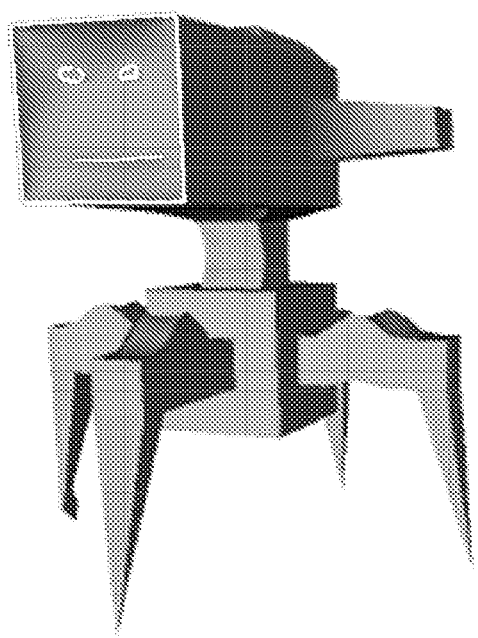

FIGS. 7*a* through 7*f* illustrate an example of a method that may be used to modify a representation of a 3D shape using feature curves. FIG. 7*a* illustrates a densely-triangulated mesh representing a 3D model with sharp edges. In some embodiments, the sharp edges of the 3D model may be identified and tagged as feature curves, as indicated in FIG. 7*b*. The triangulated mesh may be segmented into disjoint regions that may be enclosed by the feature curves, as illustrated in FIG. 7*c*. As shown in FIG. 7*d*, the 3D shape may remeshed by tessellating each separate region bound by feature curves. In one embodiment, the tessellation used is triangulation. Feature curve constraints (mean curvature constraints and/or surface normal constraints) are input by a user, and the 3D shape is modified according to the constraints, as indicated in FIG. 7*e*. As illustrated in FIGS. 7*e* and 7*f*, new feature curves may be added to the 3D shape and used to modify the 3D shape. In some embodiments, the operations shown in FIGS. 7*b* through 7*d* may be performed transparently to the user.

In some embodiments, a user may add feature curves anywhere on a 3D shape to automatically obtain a new 3D shape with the new feature curves in place. The user may also specify constraints (mean curvature and/or surface normal constraints) for the new feature curves. The user may also add, remove, or modify mean curvature constraints and/or surface normal constraints to the 3D shape, if desired. Other constraints, such as pixel position constraints, may also be added to, removed from, or modified for the 3D shape. In response to the addition of one or more new feature curves, the system may be configured to perform operations 600 through 606 of FIG. 6 to generate a newly modified 3D shape including the new feature curves added by the user.

Triangulation

As indicated at 604 of FIG. 6, the feature curve tool may tessellate the areas bounded by the feature curves to generate the initial 3D shape. In performing the tessellation, some embodiments of the feature curve tool may restrict the surface representation to a triangle mesh that is obtained by triangulating the surface within the feature curve boundaries. Any of various triangulation methods may be used to generate a high-quality triangulation. Some embodiments may maintain a maximum area constraint for the triangles (which may be provided as a configurable option in the triangulation method) to prevent rendering artifacts due to very large triangles.

An advantage of solving for the modified 3D shape using a triangle mesh (as opposed to a regular grid) is efficiency due to mesh adaptivity: the triangle mesh may be specified to have high detail only near complicated constraints, and to be coarse where there are not many constraints. In one embodiment, the mesh connectivity is not updated as the surface is modified. In other embodiments, the mesh may dynamically be made denser in parts of the modified shape that have high curvature, which may be more efficient and smoother in terms of rendering.

3D Shape Modification

As indicated at 610 of FIG. 6, the feature curve tool may be configured to modify the 3D shape according to the specified constraints. In some embodiments, the unconstrained parts (e.g., parts not included in feature curves) of the 3D surface may be obtained by solving a variational system that maintains surface smoothness. Smoothness may be maintained because it gives an organic look to the modified surface and removes any unnatural and unnecessary bumps and creases from the surface.

In one embodiment, the variational formulation may be based on the principles of partial differential equation (PDE) based boundary constraint modeling, where the Euler-Lagrange equation of some aesthetic energy functional is solved to yield a smooth surface. One embodiment may use a 'thin-plate spline' as the desired surface; the corresponding Euler-Lagrange equation is the biharmonic equation. In this embodiment, for all free vertices at position x, the PDE $\Delta^2(x)=0$ is solved. The solution of this PDE yields a $C^2$ continuous surface everywhere except at the position constraints (where the surface can be either $C^1$ or $C^0$ continuous). One embodiment may use cotangent-weight based discretization of the Laplacian operator $\Delta(x)$.

The fourth-order PDE ($\Delta^2(x)=0$) may be too slow to solve interactively. Therefore, one embodiment converts the non-linear problem into a linear problem by assuming that the parameterization of the surface is unchanged throughout the solution. In practice, this means that the cotangent weights used for the Laplacian formulation are computed only once and are subsequently unchanged as the surface is modified. This approximation has been used extensively for constructing smooth shape deformations, but it may significantly differ from the correct solution in certain cases. Instead of correcting this with a slower, sometimes-divergent, iterative non-linear solver, embodiments may characterize the linear solution and use its quirks to provide extra dimensions of artist control.

An advantage to using a linear system in the solver is that the linear system has a unique solution. In contrast, non-linear systems may generate multiple solutions (for example, a global and local minimum). Thus, using a non-linear system, the solver may get trapped in a local minimum, possibly yielding an undesired solution (e.g., the global optimum may not be found). Different non-linear solvers may arrive at different local minima. Thus, using a linear system may provide consistency and efficiency. A trade-off to using a linear system is that the resulting surface may not be quite as smooth as a globally optimal solution to a non-linear system. For artistic purposes, however, a solution produced by a linear system is sufficient.

Linear Systems
Mean Curvature Constraint Embodiments

The following describes the formulation of a variational linear system according to embodiments that use mean curvature constraints. In these embodiments, a linear system $\overline{Ax}=\overline{b}$ may be implemented, where the matrix A is a sparse n×n matrix (where n is 3× the number of free vertices) that represents the local geometric relationships between the vertices and their neighbors. The vector $\overline{x}$ of length n represents the positions of free vertices and the vector $\overline{b}$ of length n represents the known quantities. For all three coordinates of every free vertex, an equation is formulated that is linear in terms of the vertex's neighbors. In one embodiment, the formulation may be based primarily on methods of discrete geometric modeling. A method has been described in the art to formulate a linear system that can handle smooth or sharp internal constraints; unfortunately the formulation requires a strip of triangles to complete the one-ring neighborhood of the boundary vertices. Generating this strip of triangles, especially when the feature curve has large concavities, is not trivial. In addition, a surface modeling system has been described in the art that takes $G^1$ boundary constraints and does not need the special triangle strip on the boundary. However, this surface modeling system requires two linear solutions: one for the mean curvature scalar field and another for the positions that satisfy the computed mean curvature field. Embodiments of the feature curve generation method combine the benefits of these two approaches. In so combining, embodiments of the feature curve generation method that use the mean curvature constraint do not need a strip of triangles on the boundary to perform the surface modification, and solve only one linear system. This is possible because the feature curve generation method considers the mean curvature at the boundary vertices as a degree of freedom, one that can be used to modify the 3D surface.

One embodiment may use a conjugate-gradient implementation to solve the linear system $\overline{Ax}=\overline{b}$. Since the matrix A is sparse, symmetric and positive-definite, other embodiments may factorize the matrix, which may decrease iterative update times. For example, in one embodiment, a Cholesky decomposition of the matrix A may be performed, and in one embodiment, a direct solver may be used to solve the linear system. Other solvers may be used to solve the linear system in other embodiments. For example, a sparse Cholesky solver or a conjugate-gradient solver may be used. Other techniques such as multi-grid solvers may also be used.

Figure 8:
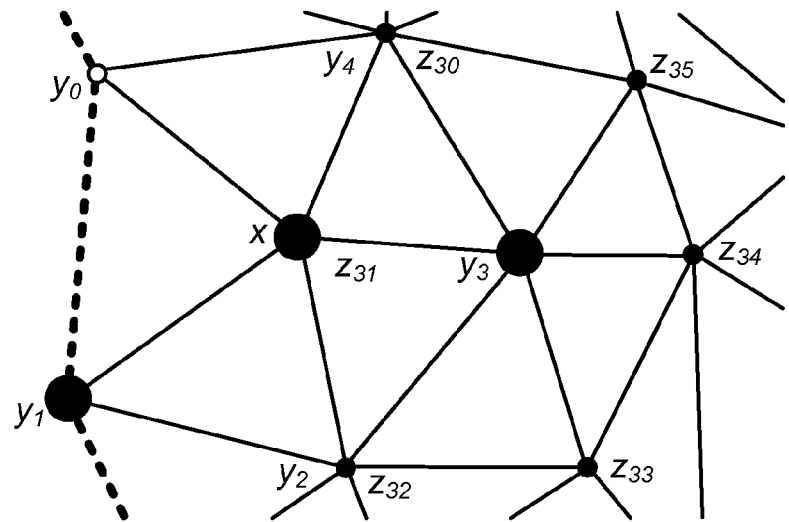
FIG. 8 illustrates a mesh vertex and one-ring neighbors according to some embodiments.

FIG. 8 illustrates a mesh vertex of position x and one-ring neighbors $y_i$ and various variables used in the equations below. As illustrated in FIG. 8, vertex x has neighbors $y_0$, $y_1$ on the boundary (constrained mean curvature) and neighbors $y_2$, $y_3$, $y_4$ in the interior with a full one-ring neighborhood (unconstrained mean curvature). The required $C^2$ smooth surface can be obtained by solving for a surface with a vanishing bi-Laplacian at all vertices:

$$\Delta^2(x) = \Delta(\Delta x) = 0 \qquad (1)$$

The Laplacian at a mesh vertex is given by its one-ring neighborhood. A discrete Laplace operator may be used, for example the Laplace-Beltrami operator defined for meshes may be used:

$$\Delta x = \frac{1}{(2A_x)}\left(x - \sum_i w_i y_i\right) \qquad (2)$$

where $w_i$ are the normalized cotangent weights and $$\frac{1}{(2A_x)}$$

is a scaling term that includes the weighted area $A_x$ around the vertex x that improves the approximation of the Laplacian. Note that other Laplace operators for meshes may be used in various embodiments. Substituting in equation (1):

$$\Delta^2 x = \frac{1}{(2A_x)}\Delta\left(x - \sum_i w_i y_i\right) = 0 \qquad (3)$$

Since Δ is a linear operator:

$$\Delta^2 x = \Delta x - \sum_i w_i \Delta y_i = 0 \quad (4)$$

Consider the situation in FIG. 8, where some one-ring neighbors are in the mesh interior, and some are on the boundary. It is assumed that the mean curvature of the boundary vertices is given as a constraint. Assume $y_j$ represents the one-ring vertices whose mean curvatures $h_{y_j}$ are known. For those vertices, the Laplacians may be computed simply by using the expression $\Delta y_j = (h_{y_j} n_{y_j})/2$. Moving such known Laplacians to the right hand side of equation (4), the following is obtained:

$$\Delta^2 x = 0 \Rightarrow \Delta x - \sum_i w_i \Delta y_i = \sum_j \frac{w_j h_{y_j} n_{y_j}}{2} \quad (5)$$

Note that the term $(h_{y_j} n_{y_j})/2$ essentially represents a force of magnitude $0.5 h_{y_j}$ in the direction $n_{y_j}$ applied by the neighboring vertex $y_j$ on vertex x. In some embodiments, the force is applied in the direction of the initial vertex normal (the normal in the flat configuration—the Z axis). One embodiment does not use the vertex normals from the modified state, as that may produce non-linear vertex motion that is path-dependent and unintuitive. Therefore, by increasing the value of $h_{y_j}$, the magnitude of the force on the vertex x is increased, effectively pushing it up. Finally, the Laplacians of vertices with unknown mean curvatures is expanded in equation (4) to get the linear equation for the free vertex x:

$$x - \sum_i w_i y_i - \sum_i w_i \left[ y_i - \sum_k w_{ik} z_{ik} \right] = \sum_j \frac{w_j h_{y_j} n_{y_j}}{2} \quad (6)$$

Constructing such equations for every free vertex yields the linear system $\overline{Ax} = \overline{b}$, the solution of which provides the modified surface.

Surface Normal Constraint Embodiments

The following describes the formulation of a variational linear system according to embodiments that use surface normal constraints. In some embodiments, a linear system $\overline{Ax} = \overline{b}$ may be implemented, where the matrix A is a sparse n×n matrix (where n is 3× the number of free vertices) that represents the local geometric relationships between the vertices and their neighbors. The vector $\overline{x}$ of length n represents the positions of free vertices and the vector $\overline{b}$ of length n represents the known quantities. For all three coordinates of every free vertex, an equation is formulated that is linear in terms of the vertex's neighbors. In this embodiment, the formulation may be based primarily on a method of discrete geometric modeling, with the addition of constraint types. A method has been described in the art to formulate a linear system that can handle smooth or sharp internal constraints; unfortunately, the formulation requires a strip of triangles to complete the one-ring neighborhood of the boundary vertices. Generating this strip of triangles, especially when the feature curve has large concavities, is not trivial. Therefore, embodiments of the feature curve tool that use a surface normal constraint provide a method to "fake" these triangles with locally-correct "ghost" vertices.

Figure 9:
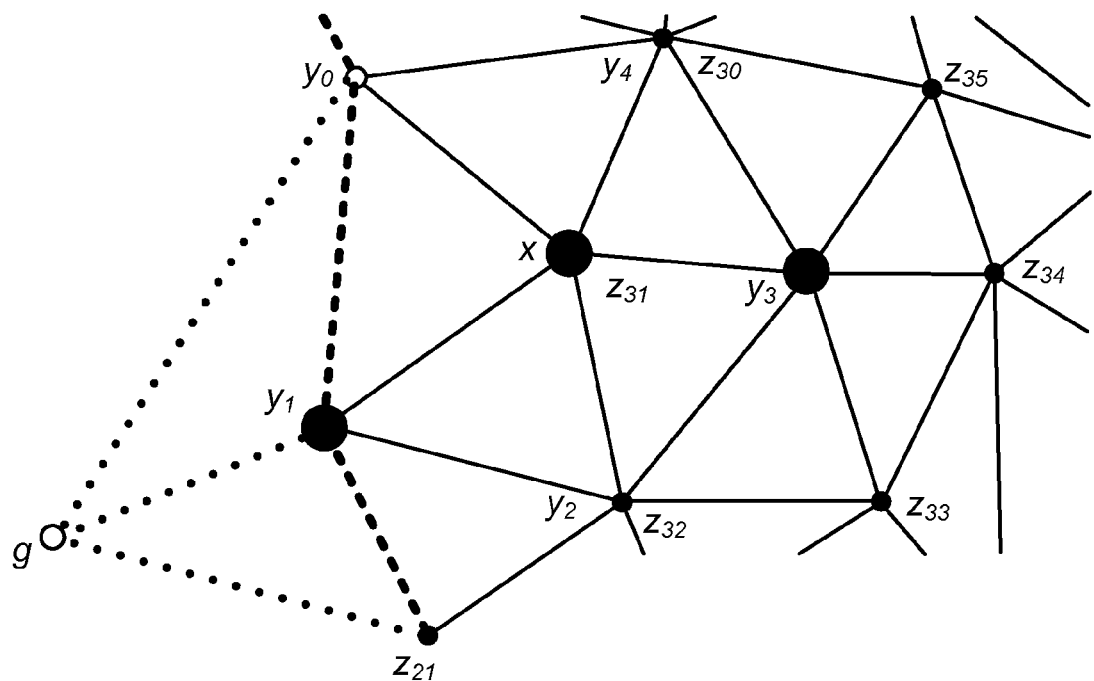
FIG. 9 illustrates a mesh vertex of position x and one-ring neighbors $y_i$ according to some embodiments.

FIG. 9 illustrates a mesh vertex of position x and one-ring neighbors $y_i$ and various variables used in the equations below. As illustrated in FIG. 9, vertex x has neighbors $y_0$, $y_1$ on the boundary, and neighbors $y_2$, $y_3$, $y_4$ in the interior with a full one-ring neighborhood. Each boundary vertex has its own ghost vertex and two corresponding ghost triangles—for example, $y_1$ has ghost vertex g—to artificially provide the required one-ring neighborhood.

Consider a mesh vertex of position x and one-ring neighbors $y_1$ as shown in FIG. 9. A $C^2$ smooth surface can be obtained by solving for a surface with a vanishing bi-Laplacian at all vertices:

$$\Delta \Delta^2(x) = \Delta(\Delta x) = 0 \quad (7)$$

where the bi-Laplacian operator $\Delta^2$ may be defined in terms of a discrete Laplacian operator.

The Laplacian at a mesh vertex is given by its one-ring neighborhood:

$$\Delta x = \Sigma_i w_i (x - y_i) \quad (8)$$

where $w_i$ are the unnormalized cotangent weights scaled by inverse vertex area. In some embodiments, cotangent weights may be computed in the planar domain and held constant to linearize the system.

Substituting in equation (7):

$$\Delta^2 x = \Delta \left( \sum_i w_i (x - y_i) \right) = 0 \quad (9)$$

Since Δ is a linear operator:

$$\Delta^2 x = \sum_i w_i \Delta x - \sum_i w_i \Delta y_i = 0 \quad (10)$$

This expands finally to:

$$\left( \sum_i w_i \right)^2 x - \left( \sum_i w_i \right) \left( \sum_i w_i y_i \right) - \sum_i w_i \left[ \left( \sum_k w_{ik} \right) y_i - \sum_k w_{ik} z_{ik} \right] = 0 \quad (11)$$

where $z_{ik}$ refers to ghost vertices where necessary to complete a one-ring. In one embodiment, constrained vertices may be treated as absolute constraints, so their positions are moved to the right hand side of the system. Because it may be convenient to over-constrain the system, and satisfy other types of constraints in a least squares sense, in one embodiment the whole equation may be scaled by the inverse of:

$$\left( \sum_i w_i \right)^2 \quad (12)$$

so that the magnitude of errors will be proportional to a difference in positions, and not scaled by any area or mean curvature values. Constructing such equations for every free vertex (e.g., a vertex not constrained by a feature curve) gives the linear system $\overline{Ax} = \overline{b}$, whose solution provides the modified surface. Since the construction is not symmetric and may be over-constrained, it may be solved using the normal equations.

Placement of Ghost Vertices

In one embodiment, for each patch of a mesh surface, a canonical view direction may be assumed to be known; this may be the direction from which, for example, an original photograph was taken, or from which the original boundary constraints were drawn. An 'up' vector which points towards the camera of this canonical view may be derived. Ghost vertices may then be placed in a plane perpendicular to the 'up' vector, and normal to the constraint curve of their parent vertex. In one embodiment, each ghost vertex may be placed the same fixed distance d from the curve. For example, in FIG. 9, assuming a vector out of the page u, the ghost vertex g is positioned at:

$$y_1 + d(u \times (z_{21} - y_0))/\|u \times (z_{21} - y_0)\| \tag{13}$$

The ghost vertices may then be rotated about the tangent of the constraint curve (the boundary) to change the normal direction. Note that ghost vertices may be added for both external and internal boundaries of a 3D shape.

Smoothness of Position Constraints

In one embodiment, either smooth ($C^1$) or sharp) ($C^0$) position constraints may be specified. The smoothness value may be varied by assigning a weight to the constrained vertex in equation (6) or in equation (11). In one embodiment, the weight that controls the smoothness of the position constraints may take any floating point value between 0 ($C^0$ continuous) and 1 ($C^1$ continuous). However, in one embodiment, it may be useful to have only two options (smooth/sharp), and to draw position constraints with a fixed smoothness for all vertices. Other embodiments may allow the use of varying smoothness across individual position constraints. FIGS. 11a through 14c illustrate examples of smooth/sharp position constraints and will be described in further detail below.

Curvature Constraints

In one embodiment, curvature constraints may be specified along with position constraints. When the value of a curvature constraint is modified, the surface is modified so that the approximation of the mean curvature at the constraint point matches the value of the curvature constraint. The curvature constraint may be used to locally modify the surface around the position-constrained vertices. In one embodiment, the initial value for the curvature constraint is set to zero, but in other embodiments the initial value may be set to any arbitrary value.

Options for Constraints

Assigning a mean curvature constraint or a surface normal constraint to a vertex is an indirect method of applying a force to the one-ring neighbors along the direction perpendicular to the initial, flat surface. However, in some embodiments, the default behavior may be modified, and additional forces may be applied in arbitrary directions. As an example, in one embodiment, a 'gravity' option may be added to the curvature constraints where another force is applied in a slightly downward direction (to the right hand side of equation (6)), causing the entire surface to bend downwards. This may be used, for example, to create the illusion of a viscous material on a vertical plane. In some embodiments, other directions than "down" may be specified to cause the surface to flow in a specified direction.

Oriented Position Constraints

In one embodiment, the ghost vertex concept described for surface normal constraints may be extended to internal feature curves that may be used to control the orientation of the surface. As illustrated in FIGS. 10a through 10c, the calculation of the Laplacian at the constrained vertex may be modified. FIGS. 10a through 10c illustrate that the ghost Laplacians may extend naturally to internal feature curves except at the endpoints of open internal feature curves. At such endpoints, there are no longer well defined sides of the curve (especially for internal feature curves which are just a single point) and therefore a different method should be used for computing the Laplacian. In one embodiment, the Laplacian in this degenerate case may be defined using just the originating vertex x for which the bi-Laplacian is being computed and the opposing ghost vertex g as the "'one ring'" of the constrained vertex. Since the measures of vertex area and cotangent weights do not extend to this case, the sum of area-normalized cotangent weights from the originating vertex may be used. The method then lets the two vertices share that weight sum equally. Therefore, the Laplacian may be defined as:

$$(w_i/\Sigma_i w_i)y_i - (g+x)w_i/(2\Sigma_i w_i) \tag{14}$$

FIGS. 10a through 10c illustrate oriented position constraints according to one embodiment. An internal oriented position constraint line (e.g., feature curve) is shown in FIG. 10a. When calculating the bi-Laplacian of vertex x, one embodiment may calculate the Laplacian at y by creating ghost g, so the one ring of vertex y is (x, n1, g, n2) as shown in FIG. 10b. Note that $n_1$ is on the end of the constraint line, so to compute its Laplacian g is instead placed along the vector from x to $n_1$, and the Laplacian at $n_1$ is computed using only vertices x, $n_1$, and g.

Pixel-Position Constraints

FIG. 11 illustrates pixel-position constraints according to one embodiment. As indicated in FIG. 11, a pixel-position constraint allows a vertex p to move freely along vector d. A user may wish to constrain a vertex (or a region) on a 3D surface to always project to the same position in screen space from a given view, without fully constraining the position of that vertex or region. In one embodiment, this may be allowed by over-constraining the linear system with additional constraints referred to as pixel-position constraints. These constraints may be written into the matrix as two linear constraints for two arbitrary unit vectors orthogonal to the camera ray d–$o_1$ and $o_2$. For a point p with initial position p', the constraint equations are $o_1 \cdot (p-p')=0$, and the equivalent for $o_2$.

Note that without pixel-position constraints, the linear system may be written separately for x, y and z, but for arbitrary pixel position constraints, x, y and z may be arbitrarily coupled. This may have a performance cost, as the matrix would be nine times larger. For less free-form applications, it may therefore be useful to keep the system decoupled by implementing pixel-position constraints only for axis-aligned orthogonal views. In these cases the constraint is simply implemented by fixing the vertex coordinates in two dimensions and leaving it free in the third.

Pixel position constraints may be used with mean curvature constraints, with surface normal constraints, or with a combination of mean curvature constraints and surface normal constraints.

Mixing Pixel-Position and Orientation Constraints

In many cases, orientation and pixel-position are known, but it may not be desired by the artist to fix the position fully—for example, when modeling a face, there may be a certain angle at the nose, but the artist may still want to allow the nose to move smoothly out when puffing out the cheeks of the character. To allow this, one embodiment may mix pixel-position and orientation constraints. The vertex loses its bi-Laplacian smoothness constraints, and gains ghost vertices and pixel-position constraints. Ghost vertices are specified relative to the free vertices of the pixel-position constraint, instead of absolutely. However, this removes three bi-Laplacian constraint rows in the matrix for every two pixel-position rows added (assuming a coupled system) making the system under-constrained. Therefore, additional constraints may be needed. In one embodiment, for a first additional constraint, it may be observed that when a user draws a line of pixel-position constraints, the user likely wants the line to retain some smoothness or original shape. For adjacent vertices $p_1$, $p_2$ on the constraint line, which are permitted to move along vectors $d_1$ and $d_2$ respectively, one embodiment may therefore constrain the vertices to satisfy:

$$(p_1-p_2)\cdot(d_1+d_2)/2=0 \qquad (15)$$

Since the system is still one constraint short, one embodiment may add an additional constraint specifying that the Laplacian at the endpoints of the constraint line (computed without any ghost vertices) should match the expected value (which is known by the location of the ghost vertices relative to the constraint curve). Scaling these Laplacian constraints adjusts the extent to which the constrained vertices move to satisfy the normal constraints.

Exploiting the Linearization

The system described herein is a linear system because the non-linear area and cotangent terms have been made constant, as calculated in some original configuration. The linearization may be thought of as allowing the 'stretch' of triangles to be considered as curvature, in addition to actual curvature; therefore variation is minimized in triangle stretch+curvature, instead of just curvature. In some embodiments, this can be exploited by intentionally stretching triangles: for example, by intentionally moving ghost vertices, their area of effect may be increased. This is similar to moving a Bezier control point along the tangent of a curve.

The linearization may also cause the solution to collapse to a plane if all of the control vertices are coplanar. This may be visible in the system as the ghost vertices at the boundaries are rotated to be coplanar and inside the shape, resulting in a flat, folded shape. However, in one embodiment, the need for modeling this shape with a single linear system may be avoided by allowing the system to be used as a patch-based modeling system, with ghost vertices enforcing $C^1$ continuity across patch boundaries.

Surface Normal Constraint Examples

FIGS. 12a through 15c illustrate examples of the application of surface normal constraints, and also show the effect of smooth position constraints, according to some embodiments. These examples show that surface normal constraints may be used (rotated) to generate concave, flat, or convex angles at boundaries.

Figure 12A:
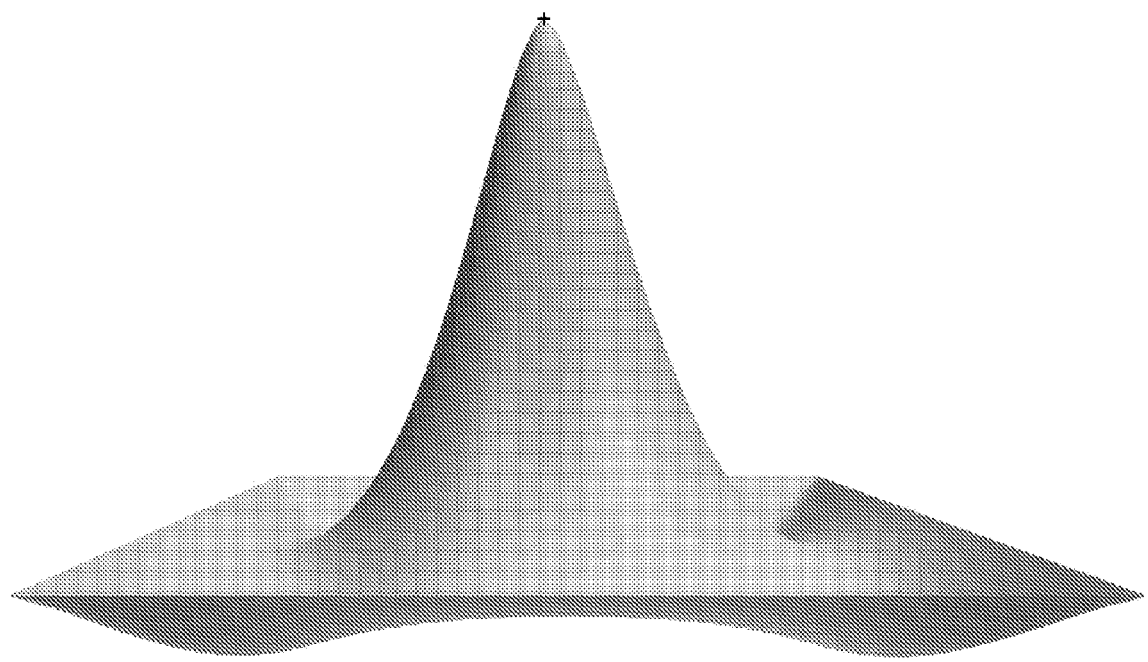
FIGS. 12a and 12b show an example surface generated with a smooth position constraint and with a concave angle at the boundary as specified using surface normal constraints, according to some embodiments.
Figure 12B:
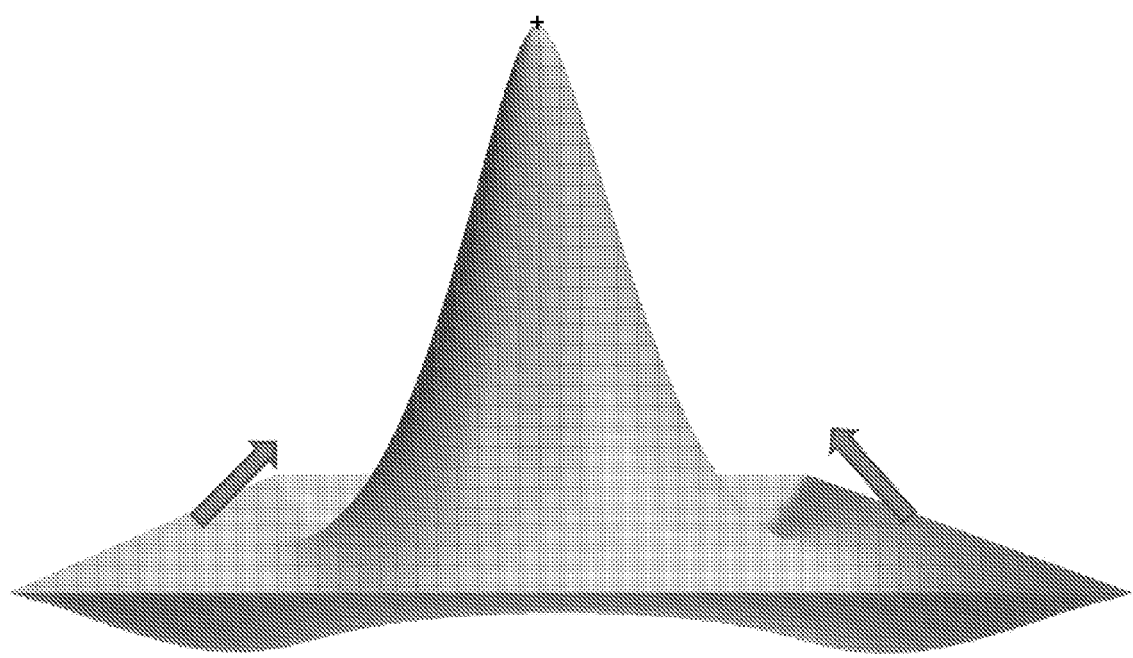

FIGS. 12a and 12b illustrate an example surface generated with a smooth position constraint at the position indicated by the "+", and with a concave angle at the boundary as specified using surface normal constraints, according to one embodiment. The arrows in FIG. 12b indicate the direction of the surface normal at the external boundary of the surface.

Figure 13A:
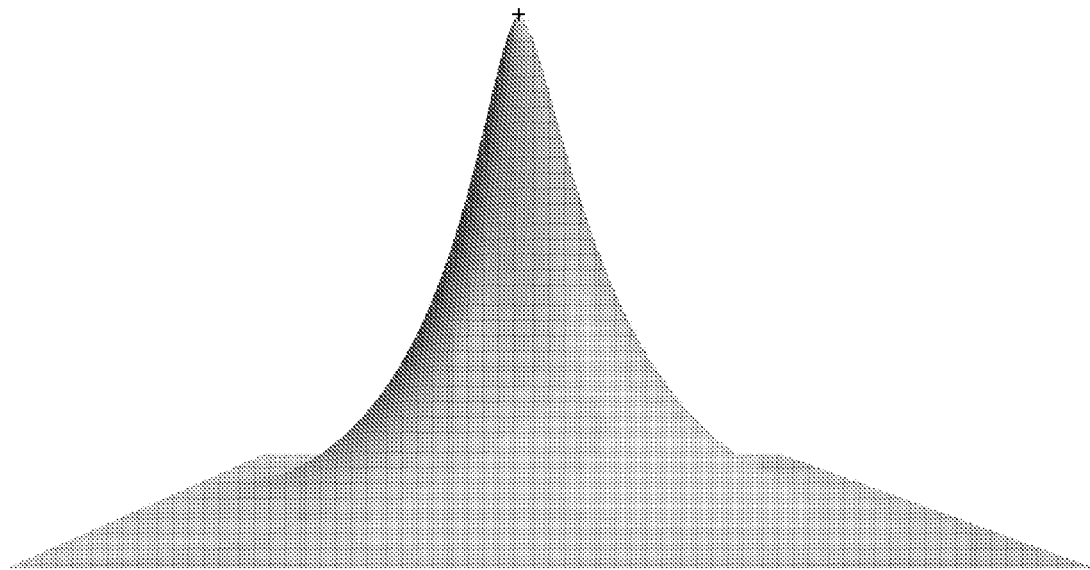
FIGS. 13a and 13b show an example surface generated with a smooth position constraint and with a flat angle at the boundary as specified using surface normal constraints, according to some embodiments.
Figure 13B:
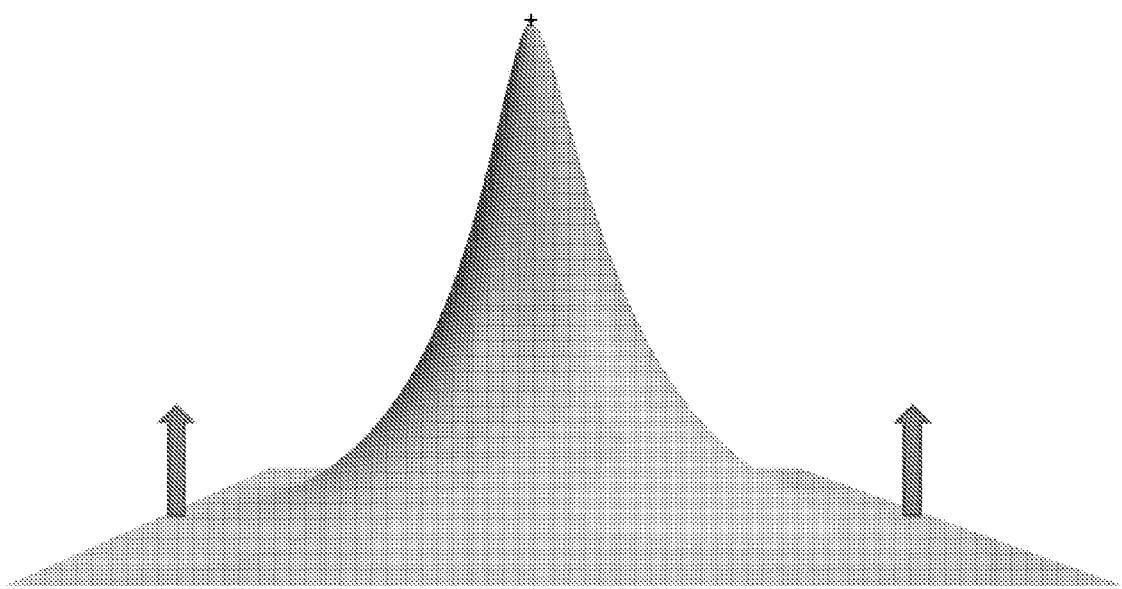

FIGS. 13a and 13b illustrate an example surface generated with a smooth position constraint at the position indicated by the "+", and with a flat angle at the boundary as specified using surface normal constraints, according to one embodiment. The arrows in FIG. 13b indicate the direction of the surface normal at the external boundary of the surface.

Figure 14A:
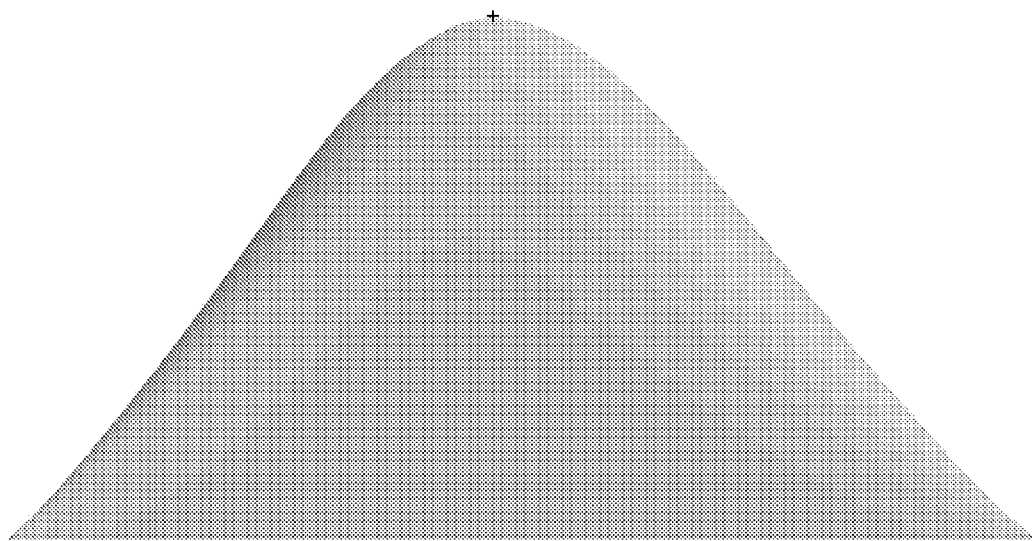
FIGS. 14a and 14b show an example surface generated with a smooth position constraint and with a convex angle at the boundary as specified using surface normal constraints, according to some embodiments.
Figure 14B:
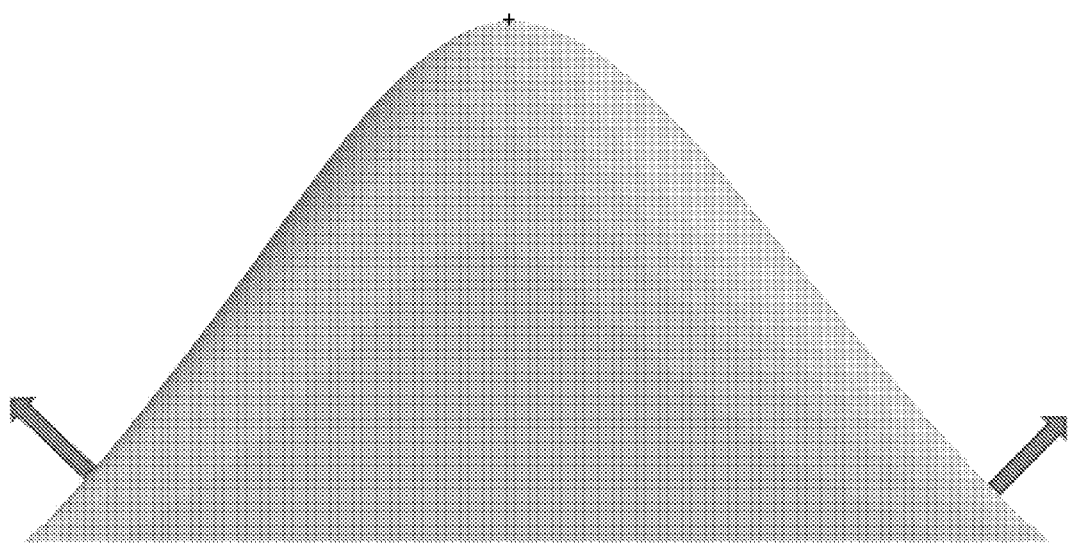

FIGS. 14a and 14b illustrate an example surface generated with a smooth position constraint at the position indicated by the "+", and with a convex angle at the boundary as specified using surface normal constraints, according to one embodiment. The arrows in FIG. 14b indicate the direction of the surface normal at the external boundary of the surface.

Figure 15A:
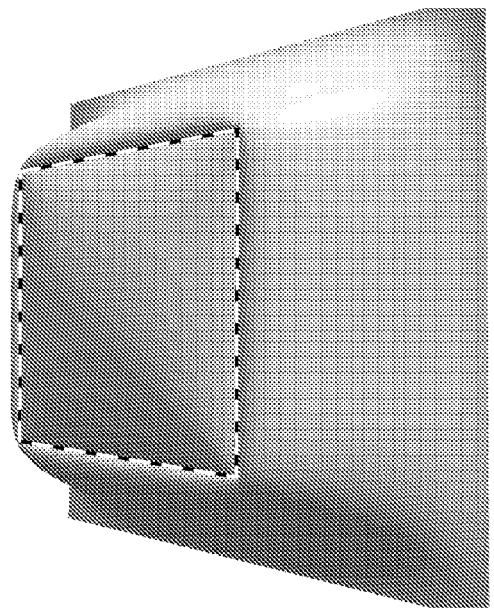
FIGS. 15a through 15c illustrate modifying the angle(s) at an internal boundary of an example surface using surface normal constraints, according to some embodiments.
Figure 15B:
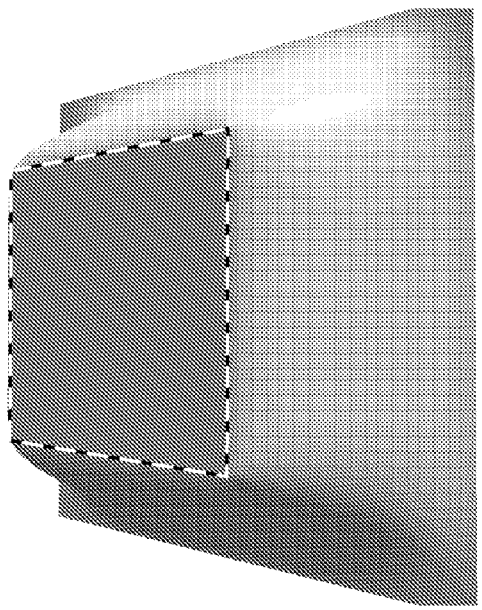
Figure 15C:
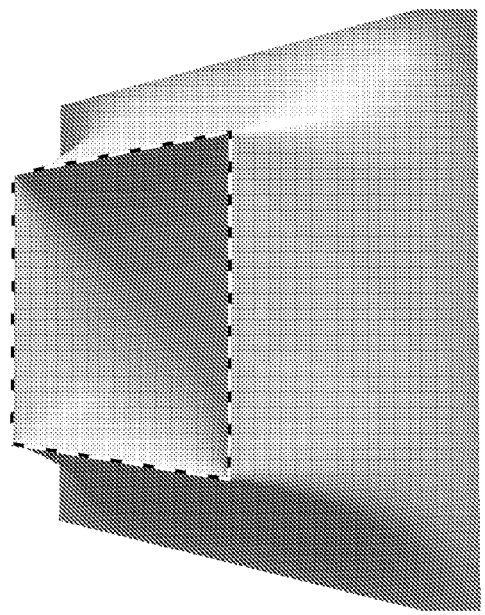

FIGS. 15a through 15c illustrate modifying the angle(s) at an internal feature curve of an example surface using surface normal constraints, according to some embodiments. The internal feature curve in the images is represented by the black-and-white dashed line. FIG. 15a shows flat angles across the internal boundary. FIG. 15b shows sharp angles across the internal boundary. FIG. 15c shows that the surface is locally inflated with varying angles at the internal feature curve.

The system for creating editable feature curves has been described herein, for example purposes, in reference to a 3D model with spatial dimensions. However, the system may also be applied to any multi-dimensional model, where the multiple dimensions may or may not be spatial dimension. For example, the system for creating editable feature curves may also be configured to determine other functions that are defined for a polygonal mesh, in addition to, or instead of, the 3D positions of mesh vertices described above. These other functions may be n-dimensional and may represent non-spatial characteristics of a model, such as color. As an example, r,g,b values representing color may be stored for the vertices of the polygonal mesh. Accordingly, the system may use the methods described above to solve for color across a particular surface. In other embodiments, the methods described above may be used to solve for one or more characteristics of a model across the surface of the model.

The system for creating editable feature curves, as described above, independently solves for each component. Accordingly, the system is configured to solve for an n-dimensional value across a surface. The system may not be limited to the bi-Laplacian system (order 4) described above. The system may also be configured to support a tri-Laplacian system (order 6) to determine the functions defined for the polygonal mesh. As an example, a six dimensional vector (x,y,z,r,g,b) representing position and color may be stored for each vertex of a polygonal mesh. The system may interpolate all six values across the surface of the mesh. The final mesh may then be rendered with position and color. In such an example, color values may diffuse away from a boundary in the same way that positional values may diffuse away from a boundary. In various embodiments, the system for creating editable feature curves may support different types of data values (e.g., color) and may support n-dimensional data vectors.

Compressed Representation of a 3D Model

A 3D model may be fully defined by the mesh connectivity (e.g., a tessellated mesh) and the feature curves of the model. In some embodiments, the mesh connectivity information and the feature curves of a 3D model may provide a complete representation of the model which may be stored in a computer-accessible medium. The 3D model may be reconstructed, for example, for visual display and modification, from the mesh connectivity information and feature curves. For example, the mesh connectivity information and feature curves representing a 3D model may be stored and subsequently retrieved from system memory as a persistent shape representation. More specifically, edits made to a 3D model may be stored as a combination of the mesh connectivity information and the modified feature curves of the 3D model. The modified version of the 3D model may be reconstructed and displayed in the previously edited state by retrieving the mesh connectivity information and feature curves from system memory. In some embodiments, the modified version of the 3D model may also be exchanged between multiple systems via exchange of the mesh connectivity information and feature curves of the 3D model.

A compressed representation of a 3D model may include the feature curves that define the 3D model and a set of boundary curves that represent regions of the 3D model. The boundary curves may represent the minimal set of regions on the surface of a 3D model that are needed to store sufficient topological information about the shape of the 3D model such that the 3D model may be accurately reconstructed. The set of boundary curves defined for the 3D model may replace the mesh connectivity information in the stored representation of the 3D model. Since the boundary curves may require less storage space in a computer-accessible medium than the mesh connectivity information, the boundary curves may enable a compressed representation of the 3D model. The 3D model may be fully represented by (and reconstructed from) the feature and boundary curves, without the need for any mesh connectivity information. The feature and boundary curve representation of a 3D model may represent all modifications made to the 3D model and may be stored, retrieved and exchanged similarly as described above for the mesh and feature curve representation of a 3D model.

Figure 16:
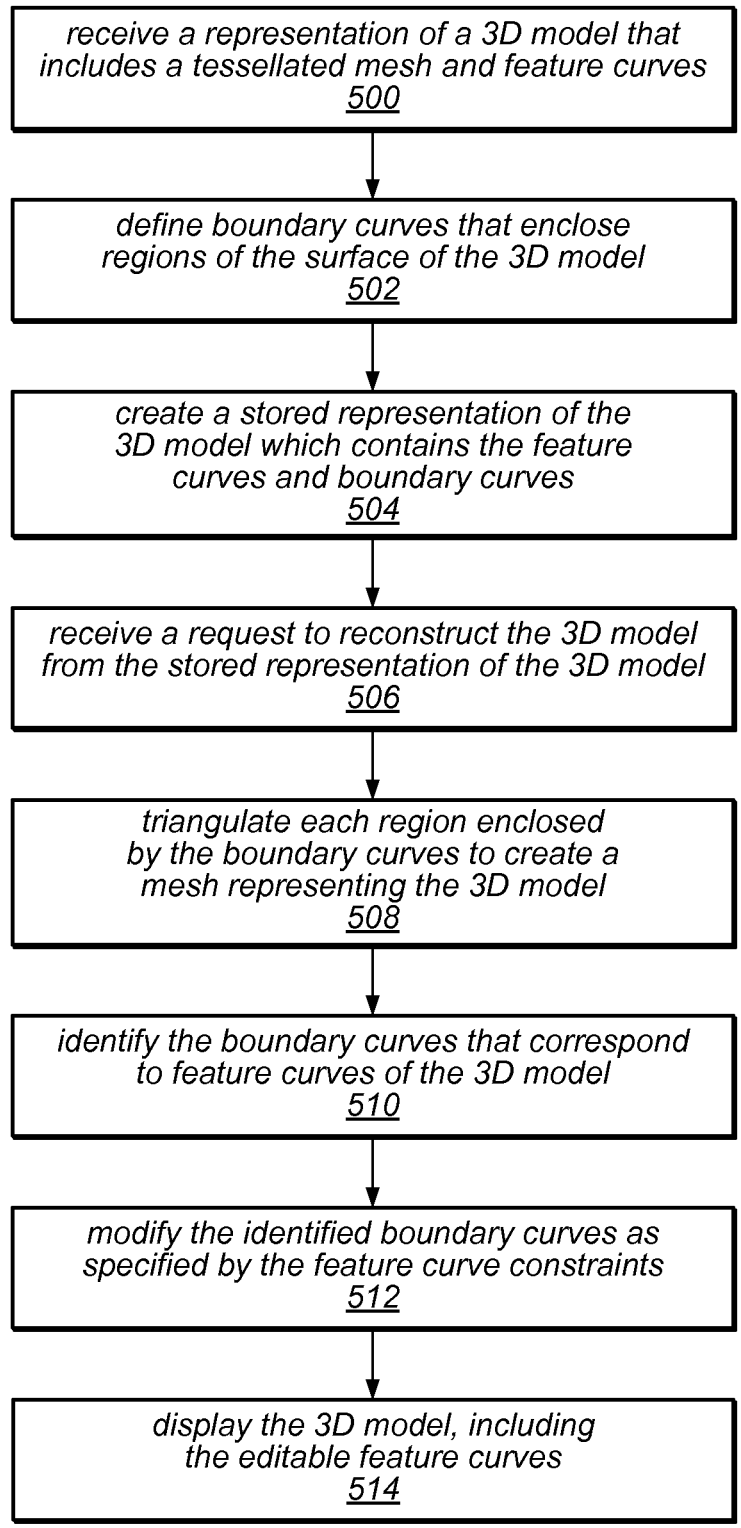
FIG. 16 is a general flowchart of a method for creating a compact representation of a 3D model using feature curves and boundary curves, according to various embodiments.

FIG. 16 is a general flowchart of a method for creating a compact representation of a 3D model using feature curves and boundary curves, according to various embodiments. As shown in 500 of FIG. 16, the method may include receiving a representation of a 3D model that includes a tessellated (e.g., triangulated) mesh and feature curves defining the 3D model. As indicated by 502, the method may include defining boundary curves (e.g., region boundaries) that enclose regions of the surface of the 3D model. The regions of the 3D surface may be formed by segmenting the triangulated mesh representing the 3D model into a number of disjoint regions, each of which may be adjacent to, but never fully contain, a feature curve.

In some embodiments, a variant of the standard k-means (Lloyd's) clustering algorithm may be used to segment the triangulated mesh representing a 3D model into multiple regions. For example, a floodfilling algorithm may be used to form the regions: a first triangle is chosen to represent a region and neighboring triangles are added to the same region dependent on certain conditions being satisfied. One condition may specify that a region not be allowed to completely surround a feature curve. For example, a neighboring triangle may not be added to a region if any of the following criteria are met: (1) adding the triangle would enclose a feature curve point, such that all triangles in the one ring neighborhood of a feature curve vertex would belong to the same region; (2) adding the triangle would enclose a feature curve edge, e.g., both triangles adjacent to the feature curve edge would belong to a same region; or (3) adding the triangle would create a loop that would enclose another region or triangles that have not yet been assigned to a region. As such, regions may be defined so that the feature curves defining the shape of the 3D model lie on the boundaries of the defined regions.

A second condition that may determine whether a triangle is added to a region may specify that a neighboring triangle may be added if the "distance" between the neighboring triangle and the first triangle representing the region is below a certain threshold. The "distance" between two triangles may be defined as the sum of surface normal disparity between the two triangles and geodesic distance between the two triangles. Adhering to the above described second condition may result in regions that are compact and well-shaped. Compact regions may be well suited for re-triangulation of the 3D model using the boundary curves defined for the 3D model, as the centroid of each region may be inserted to create a triangulated mesh within the region. The various disjoint regions defined for the 3D model may be represented by boundary curves that enclose the various regions. While embodiments are generally described herein as using a triangular mesh, other polygon meshes may be used.

As described above and illustrated in 504 of FIG. 16, a stored representation of the 3D model may be created which contains the feature curves and boundary curves defined for the 3D model. For example, the 3D model may be stored as a set of feature curves and boundary curves. The method illustrated in FIG. 16, may include, as shown in 506, receiving a request to reconstruct the 3D model from the stored representation of the 3D model. For example, a user may request a visual display of the 3D model in order to view, edit or manipulate the 3D model. As indicated in 508, in response to the request of 506, each region of the 3D model enclosed by boundary curves may be independently triangulated. The triangulated regions may be joined to create a mesh representing the 3D model. As shown in 510, the boundary curves on the triangulated mesh that correspond to feature curves may be identified. As described above, the regions of a 3D model may be defined such that the boundaries of the regions correspond with the feature curves defining the shape of the 3D model. Accordingly, the triangulated mesh generated in 508 may have edges that correspond to defined feature curves.

As illustrated in 512 of FIG. 16, the boundary curves identified in 510 may be modified as specified by the constraints of the feature curves. As in the method described above, the triangulated mesh may be modified to satisfy the constraints defined by the feature curves. The modified triangulated mesh may then accurately represent the stored version of the 3D model and may be used to display the 3D model, as indicated in 514. In some embodiments, the 3D model may be further edited, as described above, via feature curve parameter modification and/or the addition of new feature curves.

Example System

Figure 17:
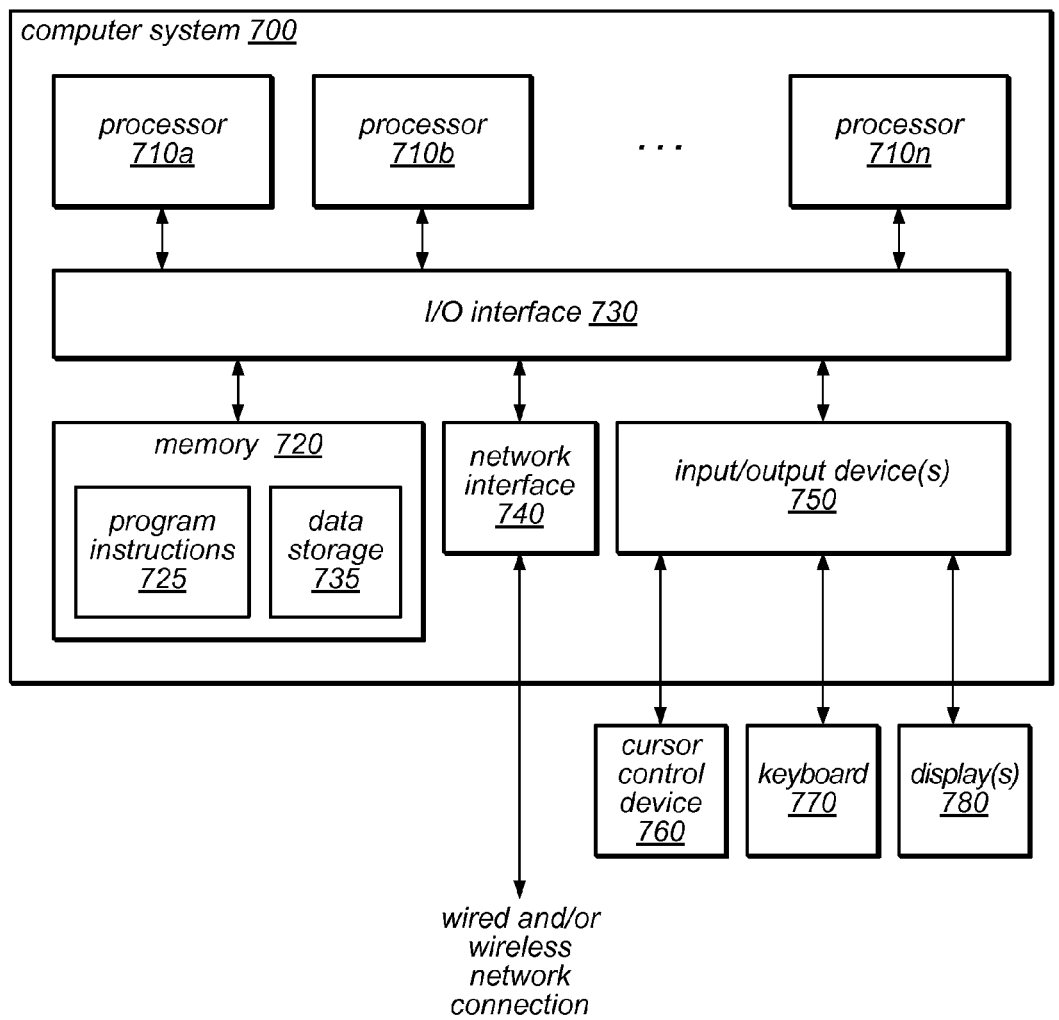
FIG. 17 illustrates an example of a computer system that may be used in embodiments.

Various components of embodiments of a feature curve tool as described herein may be executed on one or more computer systems, which may interact with various other devices. One such computer system is illustrated by FIG. 17. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for 3D shape modification may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a feature curve tool, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example.

In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 17, memory 720 may include program instructions 725, configured to implement embodiments of a feature curve tool as described herein, and data storage 735, comprising various data accessible by program instructions 725. In some embodiments, program instructions 725 may include software elements of a feature curve tool as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a feature curve tool as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   executing a feature curve tool on a processor of a computer device to perform:
   receiving a connected mesh representation of a multi-dimensional model;
   analyzing the connected mesh representation to determine feature curves that define one or more characteristics of the multi-dimensional model;
   dividing the connected mesh representation into disjoint regions defined by one or more boundaries that correspond to one or more of the feature curves, the disjoint regions each represented as a triangular mesh utilizing artificial vertices to complete triangles at triangular mesh boundaries of a disjoint region, at least one or more of the artificial vertices located outside of a boundary of the connected mesh representation;
   joining the disjoint regions to form a modified connected mesh representation of the multi-dimensional model; and
   displaying the multi-dimensional model with editable feature curves displayed as handles that are user-selectable to manipulate a displayed surface of the multi-dimensional model and modify the feature curves of the multi-dimensional model.

2. The method of claim 1, wherein said analyzing comprises:
   analyzing the connected mesh representation to locate sharp edges of the multi-dimensional model, wherein the sharp edges are regions of the multi-dimensional model with dihedral angles greater than a threshold value; and
   selecting the sharp edges as the feature curves.

3. The method of claim 1, wherein said analyzing comprises:
   analyzing the connected mesh representation to locate ridges and valleys of the multi-dimensional model, wherein the ridges and valleys are smooth regions of curvature of the multi-dimensional model with curvature derivatives greater than a threshold value; and
   selecting the ridges and valleys as the feature curves.

4. The method of claim 1, further comprising:
   generating the modified connected mesh representation of the multi-dimensional model, comprising:
   said dividing the connected mesh representation into the disjoint regions;
   tessellating each of the disjoint regions to create regional connected mesh representations that each correspond to a different one of the disjoint regions, wherein said tessellating comprises triangulating a disjoint region; and
   joining the regional connected mesh representations to form the modified connected mesh representation of the multi-dimensional model.

5. The method of claim 1, further comprising:
   receiving a user input that represents one or more modifications to the one or more characteristics of the multi-dimensional model; and
   wherein the user input is received to change a location of one or more of the handles for modifying the one or more characteristics of the multi-dimensional model, and wherein said changing the location of one or more of the handles comprises changing parameters stored for one or more of the editable feature curves that correspond to the one or more handles.

6. The method of claim 1, wherein the multi-dimensional model is a three-dimensional (3D) model and wherein each dimension is a spatial dimension.

7. A system, comprising:
   a memory; and
   one or more processors coupled to the memory, wherein the memory comprises program instructions executable by the one or more processors to implement a feature curve tool configured to:
   receive a connected mesh representation of a multi-dimensional model;
   analyze the connected mesh representation to determine feature curves that define one or more characteristics of the multi-dimensional model;
   divide the connected mesh representation into disjoint regions defined by one or more boundaries that correspond to one or more of the feature curves, the disjoint regions each represented as a triangular mesh utilizing artificial vertices to complete triangles at triangular mesh boundaries of a disjoint region, at least one or more of the artificial vertices located outside of a boundary of the connected mesh representation;
   join the disjoint regions to form a modified connected mesh representation of the multi-dimensional model; and
   initiate a display of the multi-dimensional model with editable feature curves displayed as handles that are user-selectable to modify the feature curves that define the one or more characteristics of the multi-dimensional model.

8. The system of claim 7, wherein the feature curve tool is configured to:
   analyze the connected mesh representation to locate sharp edges of the multi-dimensional model, wherein the sharp edges are regions of the multi-dimensional model with dihedral angles greater than a threshold value; and
   select the sharp edges as the feature curves.

9. The system of claim 7, wherein the feature curve tool is configured to:
analyze the connected mesh representation to locate ridges and valleys of the multi-dimensional model, wherein the ridges and valleys are smooth regions of curvature of the multi-dimensional model with curvature derivatives greater than a threshold value; and
select the ridges and valleys as the feature curves.

10. The system of claim 7, wherein the feature curve tool is configured to generate the modified connected mesh representation of the multi-dimensional model, the feature curve tool implemented to:
divide the connected mesh representation into the disjoint regions;
tessellate each of the disjoint regions to create regional connected mesh representations that each correspond to a different one of the disjoint regions, wherein the feature curve tool is configured to triangulate a disjoint region to said tessellate the disjoint region; and
join the regional connected mesh representations to form the modified connected mesh representation of the multi-dimensional model.

11. The system of claim 7, wherein the feature curve tool is further configured to:
receive a user input that represents one or more modifications to the one or more characteristics of the multi-dimensional model; and
wherein the user input is received to change a location of one or more of the handles to modify the one or more characteristics of the multi-dimensional model, and wherein the change of the location of one or more of the handles comprises a change of parameters stored for one or more of the editable feature curves that correspond to the one or more handles.

12. The system of claim 7, wherein the multi-dimensional model is a three-dimensional (3D) model and wherein each dimension is a spatial dimension.

13. A non-transitory computer-readable storage memory device comprising a feature curve tool stored as instructions that are executable and, responsive to execution of the instructions by a computing device, the computing device performs operations of the feature curve tool comprising to:
receive a connected mesh representation of a multi-dimensional model;
analyze the connected mesh representation to determine feature curves that define one or more characteristics of the multi-dimensional model;
divide the connected mesh representation into disjoint regions defined by one or more boundaries that correspond to one or more of the feature curves, the disjoint regions each represented as a triangular mesh utilizing artificial vertices to complete triangles at triangular mesh boundaries of a disjoint region, at least one or more of the artificial vertices located outside of a boundary of the connected mesh representation;
join the disjoint regions to form a modified connected mesh representation of the multi-dimensional model; and
initiate a display of the multi-dimensional model with editable feature curves displayed as handles that are user-selectable to manipulate a displayed surface of the multi\-dimensional model.

14. The non-transitory computer-readable storage memory device of claim 13, wherein the computing device performs the operations of the feature curve tool further comprising to:
analyze the connected mesh representation to locate sharp edges of the multi\-dimensional model, wherein the sharp edges are regions of the multi-dimensional model with dihedral angles greater than a threshold value; and
select the sharp edges as the feature curves.

15. The non-transitory computer-readable storage memory device of claim 13, wherein the computing device performs the operations of the feature curve tool further comprising to:
analyze the connected mesh representation to locate ridges and valleys of the multi-dimensional model, wherein the ridges and valleys are smooth regions of curvature of the multi-dimensional model with curvature derivatives greater than a threshold value; and
select the ridges and valleys as the feature curves.

16. The non-transitory computer-readable storage memory device of claim 13, wherein the computing device performs the operations of the feature curve tool to generate the modified connected mesh representation of the multi-dimensional model, the feature curve tool further comprising to:
divide the connected mesh representation into the disjoint regions; tessellate each of the disjoint regions to create regional connected mesh representations that each correspond to a different one of the disjoint regions, wherein a disjoint region is triangulated; and
join the regional connected mesh representations to form the modified connected mesh representation of the multi-dimensional model.

17. The non-transitory computer-readable storage memory device of claim 13, wherein the computing device performs the operations of the feature curve tool further comprising to:
receive a user input that represents one or more modifications to the one or more characteristics of the multi-dimensional model; and
wherein the user input is received to change a location of one or more of the handles to modify the one or more characteristics of the multi-dimensional model, and wherein the change of the location of the one or more handles comprises a change of parameters stored for one or more of the editable feature curves that correspond to the one or more handles.

18. The non-transitory computer-readable storage memory device of claim 13, wherein the multi-dimensional model is a three-dimensional (3D) model and wherein each dimension is a spatial dimension.

19. A method, comprising:
executing a feature curve tool on a processor of a computer device to perform:
receiving a connected mesh representation of a multi-dimensional model;
determining feature curves from the connected mesh representation, the feature curves defining one or more characteristics of the multi-dimensional model;
dividing the connected mesh representation into disjoint regions defined by one or more boundaries that correspond to one or more of the feature curves, the disjoint regions each represented as a triangular mesh utilizing artificial vertices to complete triangles at triangular mesh boundaries of a disjoint region, at least one or more of the artificial vertices located outside of a boundary of the connected mesh representation;
joining the disjoint regions to form a modified connected mesh representation of the multi-dimensional model;
displaying the modified multi-dimensional model with editable feature curves displayed as handles that are user-selectable to manipulate a displayed surface of the multi-dimensional model and modify the feature curves that define the one or more characteristics of the multi-dimensional model, at least one of the editable feature curves added by a user to manipulate the displayed surface of the multi-dimensional model; and storing a description of the feature curves, the editable feature curves, and the boundaries as a representation of the multi-dimensional model, without storing the modified connected mesh representation of the multi-dimensional model.

20. The method of claim 19, further comprising:

reconstructing the multi-dimensional model by recreating the modified connected mesh representation of the multi-dimensional model, wherein said recreating comprises separately tessellating each disjoint region of the modified connected mesh representation using the stored description of the feature curves, editable feature curves, and the boundaries.

* * * * *

UNITED STATES PATENT AND TRADEMARK OFFICE
CERTIFICATE OF CORRECTION

PATENT NO.         : 8,731,876 B2
APPLICATION NO.    : 12/853968
DATED              : May 20, 2014
INVENTOR(S)        : Carr et al.

It is certified that error appears in the above-identified patent and that said Letters Patent is hereby corrected as shown below:

In the Claims:

Column 25, Line 51, after "mesh representation" before ";" insert -- , and a mesh vertex of the triangular mesh formed by mesh vertices that are connected around the mesh vertex as a one-ring neighborhood, at least one of the mesh vertices being one of the artificial vertices outside of the boundary of the connected mesh representation --, therefor.

Signed and Sealed this
Second Day of September, 2014

Michelle K. Lee
*Deputy Director of the United States Patent and Trademark Office*